(12) United States Patent
Cavieres et al.

(10) Patent No.: US 9,571,031 B2
(45) Date of Patent: Feb. 14, 2017

(54) MOUNTING CLIPS FOR PANEL INSTALLATION

(71) Applicant: GEORGIA TECH RESEARCH CORPORATION, Atlanta, GA (US)

(72) Inventors: Andrés Cavieres, Atlanta, GA (US); Tristan Al-Haddad, Clarkston, GA (US); Joseph Goodman, Atlanta, GA (US); Francisco Valdes, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 9 days.

(21) Appl. No.: 14/771,246

(22) PCT Filed: Mar. 28, 2014

(86) PCT No.: PCT/US2014/032179
§ 371 (c)(1),
(2) Date: Aug. 28, 2015

(87) PCT Pub. No.: WO2014/160942
PCT Pub. Date: Oct. 2, 2014

(65) Prior Publication Data
US 2016/0020726 A1    Jan. 21, 2016

Related U.S. Application Data

(60) Provisional application No. 61/807,416, filed on Apr. 2, 2013, provisional application No. 61/806,203, filed on Mar. 28, 2013.

(51) Int. Cl.
*F16M 11/00* (2006.01)
*H02S 30/10* (2014.01)
(Continued)

(52) U.S. Cl.
CPC .............. *H02S 30/10* (2014.12); *F16B 2/241* (2013.01); *F16B 5/0685* (2013.01); *F16B 5/125* (2013.01);
(Continued)

(58) Field of Classification Search
USPC ........................................................ 248/201
See application file for complete search history.

(56) References Cited

U.S. PATENT DOCUMENTS

| 5,823,495 A | 10/1998 | Joss et al. |
| 7,285,006 B1 * | 10/2007 | Daily ............... H01R 4/4809 439/441 |

(Continued)

FOREIGN PATENT DOCUMENTS

DE     102012208480 B3     5/2013

OTHER PUBLICATIONS

International Search Report in related PCT Application No. PCT/US2014/032179, mailed Aug. 22, 2014.

*Primary Examiner* — Monica Millner
(74) *Attorney, Agent, or Firm* — Morris, Manning & Martin, LLP; Daniel E. Sineway, Esq.; R. Lee Strasburger, Jr., Esq.

(57) ABSTRACT

An exemplary mounting clip for removably attaching panels to a supporting structure comprises a base, spring locking clips, a lateral flange, a lever flange, and a spring bonding pad. The spring locking clips extend upwardly from the base. The lateral flange extends upwardly from a first side of the base. The lateral flange comprises a slot having an opening configured to receive at least a portion of one of the one or more panels. The lever flange extends outwardly from the lateral flange. The spring bonding flange extends downwardly from the lever flange. At least a portion of the first spring bonding flange comprises a serrated edge for gouging (Continued)

at least a portion of the one or more panels when the one or more panels are attached to the mounting clip to electrically and mechanically couple the one or more panels to the mounting clip.

24 Claims, 35 Drawing Sheets

(51) Int. Cl.
  *F16B 2/24* (2006.01)
  *F16B 5/12* (2006.01)
  *F16B 5/06* (2006.01)
  *F24J 2/52* (2006.01)

(52) U.S. Cl.
  CPC .............. *F24J 2/5254* (2013.01); *F24J 2/5233* (2013.01); *F24J 2/5237* (2013.01); *F24J 2002/5292* (2013.01); *Y10T 403/602* (2015.01)

(56) References Cited

U.S. PATENT DOCUMENTS

| | | | |
|---|---|---|---|
| 7,351,023 B2 | 4/2008 | Scroggie | |
| 8,181,926 B2* | 5/2012 | Magno, Jr. | F24J 2/5258 248/220.21 |
| 8,424,255 B2* | 4/2013 | Lenox | F24J 2/5245 52/173.3 |
| 8,590,223 B2* | 11/2013 | Kilgore | F24J 2/5256 136/244 |
| 8,713,881 B2* | 5/2014 | DuPont | F24J 2/5203 52/173.3 |
| 8,875,453 B2* | 11/2014 | Kanczuzewski | F16M 13/02 136/244 |
| 2006/0168773 A1 | 8/2006 | Smith et al. | |
| 2007/0257158 A1* | 11/2007 | Caveney | F16L 3/24 248/72 |
| 2010/0146747 A1 | 6/2010 | Reznar et al. | |
| 2010/0276558 A1* | 11/2010 | Faust | F24J 2/5205 248/222.14 |
| 2012/0097816 A1 | 4/2012 | Tamm et al. | |
| 2012/0201601 A1 | 8/2012 | Rizzo | |
| 2014/0003861 A1* | 1/2014 | Cheung | F24J 2/5256 403/291 |
| 2014/0008312 A1* | 1/2014 | Durney | F24J 2/5232 211/26 |
| 2014/0294493 A1* | 10/2014 | Cavieres | F16B 2/241 403/327 |

* cited by examiner

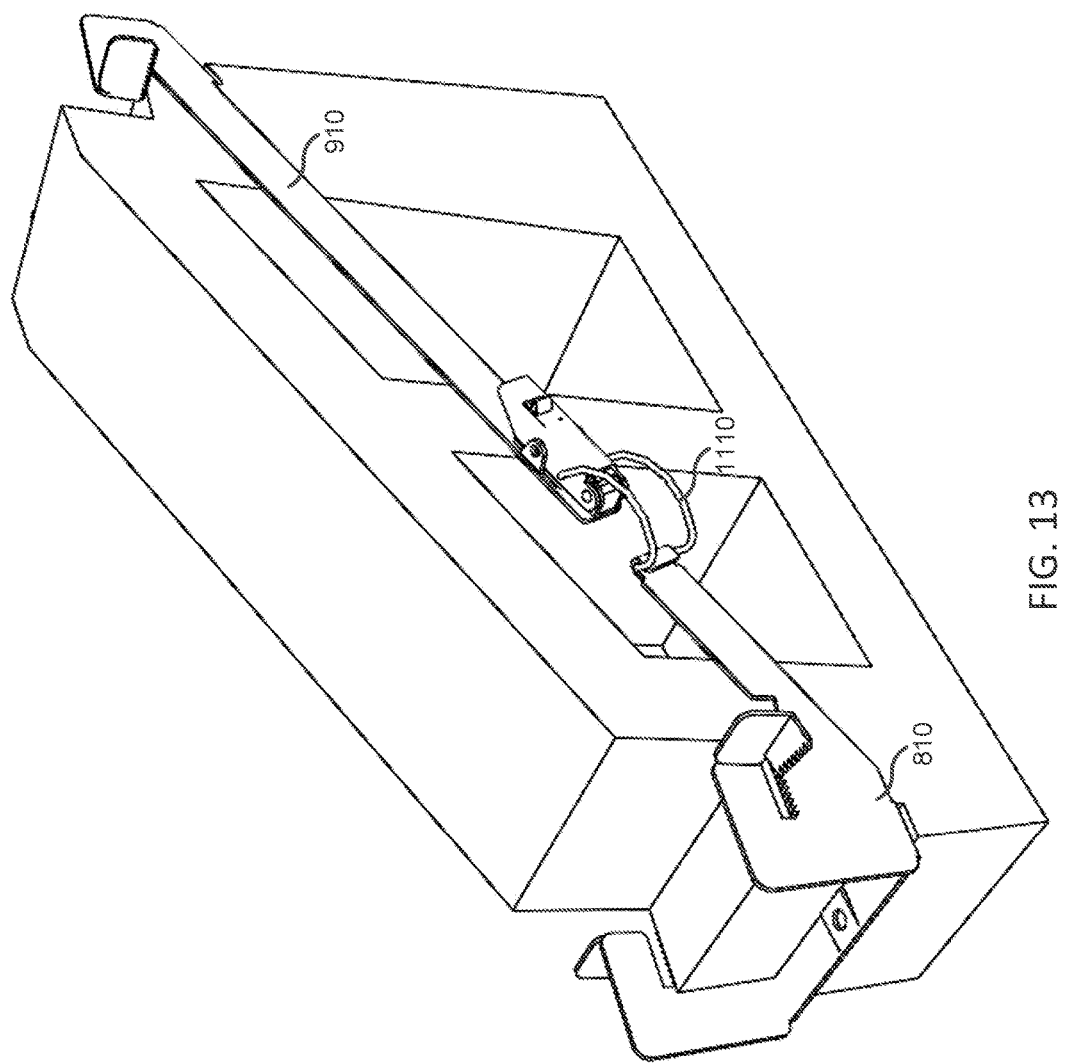

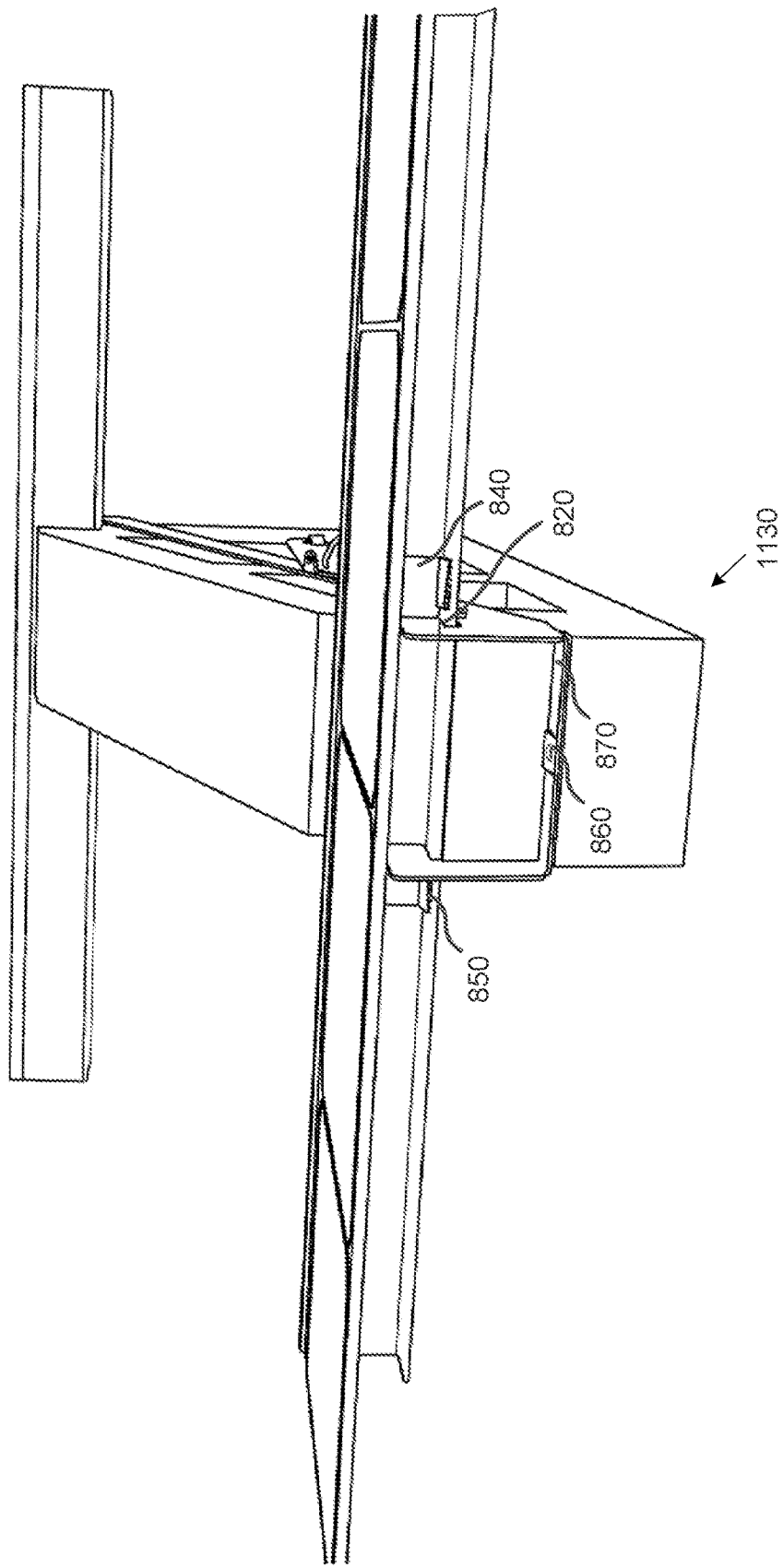

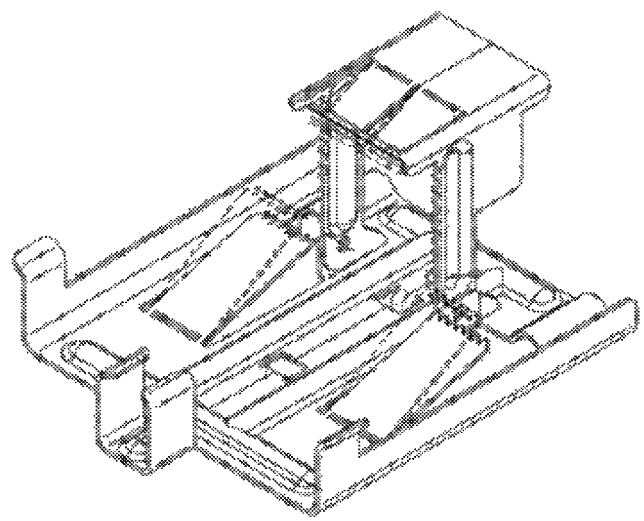
FIG. 18C
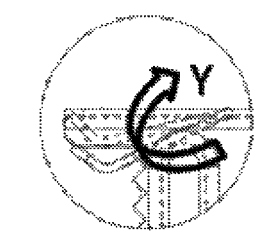
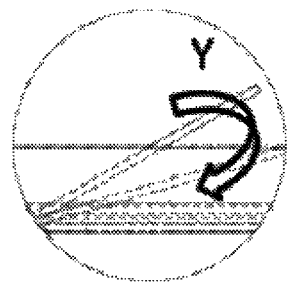
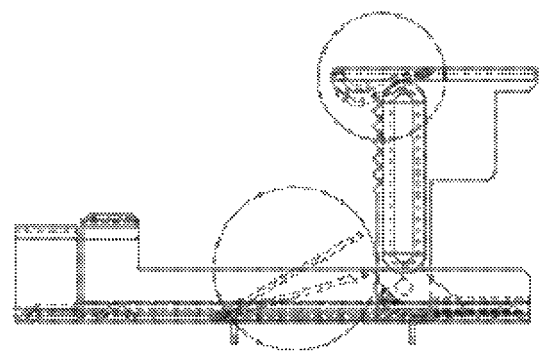
FIG. 18D

MOUNTING CLIPS FOR PANEL INSTALLATION

CROSS-REFERENCE TO RELATED APPLICATIONS

This application is a national phase application based on PCT/US2014/032179, international filing date 28 Mar. 2014, which claims the benefit to U.S. Provisional Application Ser. No. 61/807,416 filed on Apr. 2, 2013 and U.S. Provisional Application Ser. No. 61/806,203 filed on Mar. 28, 2013, each of which are herein incorporated by reference.

STATEMENT REGARDING FEDERALLY SPONSORED RESEARCH

This invention was made with Government support under Grant Number DE-EE0005441, awarded by The Department of Energy. The Government has certain rights in the invention.

TECHNICAL FIELD OF THE INVENTION

The present invention relates generally to mounting means for installation of photovoltaic systems. More particularly, the present invention relates to mounting clips for installation of photovoltaic, including but not limited to photovoltaic panels, on a mounting structure. The mounting clips provide easy and fast mechanical attachment with integrated electrical bonding.

BACKGROUND OF THE INVENTION

Photovoltaic panels are an environmentally friendly solution to generating electricity. However, they are an expensive solution, not only because of the cost of the photovoltaic panels themselves, but also because of the cost of installation of the photovoltaic panels. Typically, installation of photovoltaic panels requires highly trained installers, specialized hardware and many hours of labor to properly align the panels and install them securely and accurately.

The installation of a photovoltaic panel often requires mounting means to securely attach the photovoltaic panel to a supporting structure. Such mounting means not only needs to be mechanically sound and stable, but should also provide electrical bonding between electrically conductive components in a simple installation procedure. The conventional mounting means that are commercially available are expensive, difficult and time consuming to install, because they require many different parts and tools to assemble the photovoltaic array. Additionally, the process of bonding and grounding electrically conductive parts requires a separated process. The lack of integration between the processes of mechanical fastening and electrical bonding increases the time and cost of the solar installation.

Therefore, what is needed is a photovoltaic panel mounting means which enables both mechanical and electrical bonding at the same time when installed, and provides for an easy installation process, for just one person in an ergonomic manner, with only limited tools. This would result in a reduction of time and skill necessary to install photovoltaic panels on a mounting structure.

BRIEF SUMMARY OF THE INVENTION

The present invention relates to mounting clips for installing panels (or other photovoltaic components) on a support structure. The supporting structure can be many supporting structures known in the art, including, but not limited to, rails, beams, columns, mullions, walls, and the like.

An exemplary embodiment of the present invention provides a first mounting clip for removably attaching one or more panels to a supporting structure. The first mounting clip can comprise a base, a plurality of spring locking clips, a first and second lateral flange, a first and second lever flange, and a first and second spring bonding flange. The base can be generally planar and have a first side and an opposing second side. The plurality of spring locking clips can extend upwardly from the base to form an angle with the base that is greater than 90 degrees and less than 180 degrees. Each of the plurality of spring locking clips can provide an upward force with regards to the base when pushed downwardly. The first lateral flange can extend upwardly from the first side of the base. The first lateral flange can comprise a first slot having an opening configured to receive at least a portion of the one or more panels. The second lateral flange can extend upwardly from the second side of the base. The second lateral flange can comprise a second slot having an opening configured to receive at least a portion of the one or more panels. The first lever flange can extend outwardly from the first lateral flange and can provide x-direction guide for attaching the one or more panels. The second lever flange can extending outwardly from the second lateral flange and can provide X-direction guide for attaching the one or more panels. The first spring bonding flange can extend downwardly from the first lever flange and can form an angle with the first lever flange that is greater than 90 degrees and less than 180 degrees. The first spring bonding flange can provide Z-direction guide for attaching the one or more panels. At least a portion of the first spring bonding flange can comprise a serrated edge for gouging at least a portion of the one or more panels when the one or more panels are attached to the first mounting clip to electrically and mechanically couple the one or more panels to the first mounting clip. The second spring bonding flange can extend downwardly from the second lever flange and can form an angle with the second lever flange that is greater than 90 degrees and less than 180 degrees, the second spring bonding flange can provide Z-direction guide for attaching the one or more panels. At least a portion of the second spring bonding flange can comprise a serrated edge for gouging at least a portion of the one or more panels when the one or more panels are attached to the first mounting clip to electrically and mechanically couple the one or more panels to the first mounting clip.

In some embodiments of the present invention, one or more of the plurality of spring locking clips can have a serrated edge for gouging at least a portion of the one or more panels.

In some embodiments of the present invention, the first mounting clip can be made of a single sheet of material.

In some embodiments of the present invention, the first mounting clip can be made of a single sheet of spring material.

In some embodiments of the present invention, the first mounting clip can be made of an electrically conductive material and is configured to provide a grounding path from the one or more panels through the supporting structure.

In some embodiments of the present invention, the one or more panels are photovoltaic panels.

In some embodiments of the present invention, the first lateral flange can be a first lateral spring flange that extends upwardly from a first side of the base to form an angle with the base that is greater than 90 degrees and less than 180 degrees.

In some embodiments of the present invention, the second lateral flange can be a second lateral spring flange that extends upwardly from the second side of the base to form an angle with the base that is greater than 90 degrees and less than 180 degrees.

In some embodiments of the present invention, the first lever flange can be a first spring lever flange that extends outwardly from the first lateral flange to form an angle with the first lateral flange that is greater than 90 degrees and less than 180 degrees.

In some embodiments of the present invention, the second lever flange can be a second spring lever flange that extends outwardly from the second lateral flange to form an angle with the second lateral flange that is greater than 90 degrees and less than 180 degrees.

In some embodiments of the present invention, at least a portion of the first spring lever flange and the second spring lever flange comprises a serrated edge for gouging at least a portion of the one or more panels when the one or more panels are attached to the first mounting clip.

In some embodiments of the present invention, at least a portion of the first slot and the second slot comprises a serrated edge for gouging at least a portion of the one or more panels when the one or more panels are attached to the first mounting clip.

In some embodiments of the present invention, the first mounting clip can further comprise at least one central indexing tab extending upwardly from the base to form an angle with the base of about 90 degrees, the at least one central indexing tab providing a Y-direction indexing guide for attaching the one or more panels.

In some embodiments of the present invention, the first mounting clip can further comprise at least two attachment flanges extending downwardly from the base, each of the attachment flanges configured to interface with a portion of the supporting structure to removably attach the base to the supporting structure.

In some embodiments of the present invention, the base comprises at least one aperture configured to receive a fastener for connecting the mounting clip to the support structure.

In some embodiments of the present invention, the first mounting clip can further comprise at least one nesting flange extending upwardly from the base to form an angle with the base that is about 90 degrees, the at least one nesting flange comprising a third slot with an opening configured to receive at least a portion of a second mounting clip to detachably couple the first mounting clip to the second mounting clip.

Another exemplary embodiment of the present invention provides a second mounting clip for removably attaching one or more panels to a supporting structure. The second mounting clip can comprise a base, a plurality of bonding tabs, a top cap flange, a first side flange, a second side flange, a first lateral index tab, and a second lateral index tab. The base can be generally planar and can have a first side, an opposing second side, a first end, and an opposing second end. The plurality of bonding tabs can extend upwardly from the base between the first side and the second side. The plurality of bonding tabs can form an angle with the base that is greater than 90 degrees and less than 180 degrees. The top cap flange can be substantially parallel with the base and can be connected to the base via a pair of wall flanges extending upwardly from the base proximate the first end of the base. The first side flange can extend upwardly from the first side of the base to form an angle with the base of about 90 degrees. The second side flange can extend upwardly from the second side of the base to form an angle with the base of about 90 degrees. The first lateral index tab can extend outwardly from the first side flange proximate the second end of the base for providing a Y-direction alignment guide for attaching the one or more panels. The first lateral index tab can form an angle with the first side flange that is greater than 90 degrees and less than 180 degrees. The second lateral index tab can extend outwardly from the second side flange proximate the second end of the base for providing a Y-direction alignment guide for attaching the one or more panels. The second lateral index tab can form an angle with the second side flange that is greater than 90 degrees and less than 180 degrees. The second mounting clip can be configured to receive at least a portion of the one or more panels between the base and the top cap flange.

In some embodiments of the present invention, one or more of the plurality of bonding tabs can have a serrated edge along the Y-direction for gouging at least a portion of the one or more panels when the one or more panels are attached to the second mounting clip to electrically and mechanically couple the one or more panels to the second mounting clip.

In some embodiments of the present invention, each of the wall flanges can comprise a serrated edge along the Z-direction for gouging at least a portion of the one or more panels when the one or more panels are attached to the second mounting clip to electrically and mechanically couple the one or more panels to the second mounting clip.

In some embodiments of the present invention, each of the wall flanges can be pivotably connected to the base.

In some embodiments of the present invention, the top cap flange can comprise at least one spring tab extending downward from the top cap flange.

In some embodiments of the present invention, the second mounting clip can further comprise at least two attachment flanges extending downwardly from the base. Each of the attachment flanges can be configured to interface with a portion of the supporting structure to removably attach the base to the supporting structure.

In some embodiments of the present invention, the second mounting clip can further comprise at least one central indexing tab extending upwardly from the base to form an angle with the base of about 90 degrees. The at least one central indexing tab can provide a Y-direction indexing guide for attaching the one or more panels.

In some embodiments of the present invention, the second mounting clip can be made of a single sheet of material.

In some embodiments of the present invention, the second mounting clip is made of a single sheet of spring material.

In some embodiments of the present invention, the second mounting clip can be made of an electrically conductive material and can be configured to provide a grounding path from the one or more panels through the supporting structure.

In some embodiments of the present invention, the one or more panels can be photovoltaic panels.

In some embodiments of the present invention, the base comprises at least one aperture configured to receive at least a portion of a nesting flange of a first mounting clip to detachably couple the first mounting clip to the second mounting clip.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIG. 13 provides a first lateral clip and a second lateral clip mechanically fastened together, in accordance with some exemplary embodiments of the present invention.

FIG. 14 provides a first lateral clip mounting one of the photovoltaic panels to a ballast, in accordance with some exemplary embodiments of the present invention.

FIGS. 18A-18D provide various views of a second mounting clip, in accordance with some exemplary embodiments of the present invention.

DETAILED DESCRIPTION OF THE INVENTION

Figure 1:
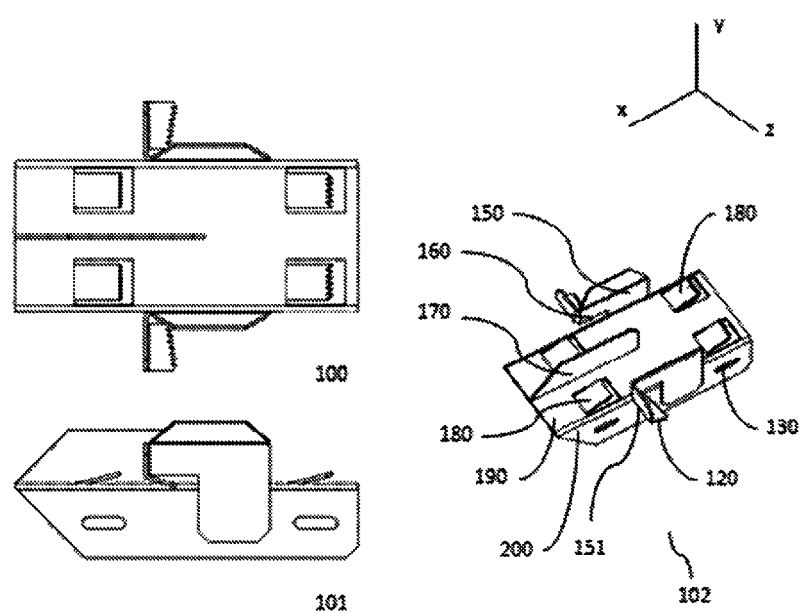
FIG. 1 provides a first mounting clip, in accordance with some exemplary embodiments of the present invention.

To facilitate an understanding of the principles and features of the present invention, various illustrative embodiments are explained below. To simplify and clarify explanation, the invention is described below as applied to mounting solar photovoltaic components, e.g., solar panels, to a support structure. One skilled in the art will recognize, however, that the invention is not so limited. Instead, as those skilled in the art would understand, the various embodiments of the present invention also find application in other areas, including, but not limited to, other fields where it is desirable to mount at panel to a structure.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

Photovoltaic components, particularly PV panels, are commonly installed suspending away from an installation surface. Generally, a structure is placed under the photovoltaic panels providing a mounting surface. The structure can be many supporting structures known in the art, including, but not limited to, rails, beams, columns, mullions, walls, and the like. In relation to photovoltaic panels, accurate measurements are needed in order to mount the panels at the right mounting points, which translates to an increase in time and cost of installation. Currently, mounting means for photovoltaic panels have several shortcomings, such as, lack of integrated electrical bonding to the mounting structure and highly complex installation process due to large number of parts, tools and training requirements.

Various embodiments of the mounting clips described herein can provide both mechanical and electrical bonding of photovoltaic components, including photovoltaic panels, to the support structures. Various embodiments of the present invention provide features of mounting clips that guide X, Y, and/or Z directional positioning of photovoltaic components into the clip. In addition, various embodiments of the present invention can limit the movement of the panels once installed using a combination of springs and serrations that actuate in X, Y, and/or Z directions. The photovoltaic mounting clips described herein can simplify installation processes of photovoltaic components by providing a reference guide and indexing mechanisms for easy and quick alignment and squaring of photovoltaic components. Moreover, for photovoltaic panels, the locking mechanism of the disclosed invention allows their installation on unleveled installation surfaces where the angle of the installation surface ranges between 0 and 90 degrees, thereby providing flexibility during the installation process.

Various embodiments of the mounting clips disclosed herein can be constructed of any material that may withstand and support the weight of the photovoltaic panels in all weather conditions without substantial damage or deformation. Materials of which may include, but not limited to, metals, such as steel, stainless steel, aluminum, titanium, and the like, ceramic composites, composite reinforced metals, plastics, and the like. In some embodiments of the present invention, mounting clips can be constructed of a conductive metal to provide a grounding path between the photovoltaic components and the support structure without the need for additional wiring. In some embodiments of the present invention, mounting clips can be constructed from a single sheet of material, i.e., of unitary construction. That is, a single sheet of material can be cut and bent to create the mounting clips described herein. In other embodiments, the mounting clips can be formed from several pieces of material via connection processes, e.g., welding. As discussed above, some embodiments of the present invention make use of the springing effect of certain parts of the mounting clips. Accordingly, in some embodiments of the present invention, the mounting clips, or portions of the mounting clips, can be made of a spring material. In some embodiments of the present invention, the mounting clips can be made from a single sheet of spring material, e.g., spring grade sheet metal.

Generally, the disclosed invention concerns a mounting clip for photovoltaic panel installation on a mounting surface. The disclosed invention teaches mounting clips formed to bond a plurality of photovoltaic components, including photovoltaic panels, onto a supporting structure, both electrically and mechanically. In some embodiments, a plurality of mounting clips are attached on top of the rails providing a mounting means that slidably locks in one or more photovoltaic panels. Some embodiments of the present invention also provide a mounting means configured to wrap around a circumference of a ballast. Various embodiments of the present invention are designed to work with different types and dimensions of photovoltaic panels and support structures, and they can support installation of panels in portrait and landscape configurations at a variety of angles.

Now turning to FIG. 1, an embodiment of a first mounting clip is shown. The first mounting clip 102 can be used to removably attach one or more panels to a support structure. The first mounting clip may comprise of a base 190, at least one central indexing tab 170, at least one attachment flange 200, a pair of lateral flanges 150, a serrated slot 160, a lever flange 151, a spring bonding flange 120, and a plurality of locking clips 180.

In one embodiment, the base 190 may have a first side and a second side. The base 190 may be configured to fit on top of a supporting structure. As shown in the various figures included herewith, the base can be generally planar. A plurality of locking clips 180 can extend upwardly and away from the base 190. As shown in FIG. 1, the plurality of locking clips can form an angle with the base that is greater than 90 degrees and less than 180 degrees. The plurality of locking clips 180 can be of a spring material where upward force is generated when pushed downwardly towards the base 190. In some embodiments of the present invention, an end of the spring locking clips opposite the base can comprise a serrated edge for gouging into at least a portion of a photovoltaic component to provide electrical and mechanical communication between the photovoltaic component and the mounting clip.

In some embodiments, the first mounting clip can comprise at least one central indexing tab 170. As shown in FIG. 1, the central indexing tab 170 can extend upwardly from the base to form an angle with the base of about 90 degrees. In some embodiments, the central indexing tab 170 can divide the base in half between the first and second sides of the base. In some embodiments, however, the first mounting clip can contain multiple central indexing tabs 170 that can together divide the base in half between the first and second sides of the base. The central indexing tabs 170 may be configured to provide a lateral Y-direction indexing guide for installing each of the one or more panels. The central indexing tabs 170 may retain movement of the one or more panels in the Y-direction. In some embodiments of the present invention, the one of more central indexing tabs 170 can be central indexing spring tabs 170 made from a spring grade material.

In some embodiments of the present invention, one or more attachment flanges 200 can extend downwardly and away from the base 190 for use in removably attaching the mounting clip to the support structure. The one or more attachment flanges 200 can be configured to interface with a portion of the support structure to removably attach the base to the support structure. For example, the one or more attachment flanges 200 can interface with each side of a rail or strut channel, providing mechanical attachment of the first mounting clip 102 to the supporting structure.

Some embodiments of the present invention also comprise one or more lateral flanges 150. The lateral flanges 150 can extend upwardly from a side of the base 190. The lateral flanges 150 can comprise a slot 160 with an opening for receiving a portion of a photovoltaic component. In some embodiments, at least a portion of the slot 160 can have a serrated edge for gouging at least a portion of the photovoltaic component. The serrated edge can extend along the X-direction. By gouging the photovoltaic component, the serrations can provide mechanical and electrical communication between the photovoltaic component and the mounting clip, and thus to the support structure. In some embodiments of the present invention, the lateral flange 150 can be a spring lateral flange made of a spring grade material. The spring lateral flanges 150 can extend upwardly from a side of the base to form an angle with the base that is greater than 90 degrees and less than 180 degrees. When a photovoltaic component is attached to the mounting clip the component can cause the spring lateral flanges to spring in a direction to decrease the angle formed between the spring lateral flange and the base causing the spring lateral flange to exert an opposing force on the photovoltaic component.

In some embodiments of the present invention, the mounting clip 102 can comprise one of more lever flanges 151 extending from of the lateral flanges 150 as shown in FIG. 1. The lever flange 151 can provide an x-direction guide for installing each of the one or more photovoltaic components and can retain movement of each of the one or more panels in x-direction. In some embodiments of the present invention, the lever flange 151 can be a spring lever flange that extends outwardly from the lateral flange 150 to form an angle with the lateral flange 150 that is greater than 90 degrees and less than 180 degrees. When a photovoltaic component is attached to the mounting clip 102 the component can cause the spring lever flanges 151 to spring in a direction to decrease the angle formed between the spring lever flange 151 and the lateral flange 150 causing the spring lever flange 151 to exert an opposing force on the photovoltaic component. In some embodiments of the present invention, the spring lever flange 151 can comprise a serrated edge for gouging into at least a portion of a photovoltaic component to provide electrical and mechanical communication between the photovoltaic component and the mounting clip. The serrated edge can be oriented along the Z-direction.

In some embodiments of the present invention, the mounting clip can comprise a one or more spring bonding flanges 120 extending downwardly from the lever flange 151 to form an angle with the lever flange 151 that is greater than 90 degrees and less than 180 degrees. The spring bonding flange 120 can provide a Z-direction guide for attaching the photovoltaic components to the mounting clip. When a photovoltaic component is attached to the mounting clip 102 the component can cause the spring bonding flanges 120 to spring in a direction to decrease the angle formed between the spring bonding flange 120 and the lever flange 151 causing the spring bonding flange 120 to exert an opposing force on the photovoltaic component. In some embodiments of the present invention, the spring bonding flange 120 can comprise a serrated edge for gouging into at least a portion of a photovoltaic component to provide electrical and mechanical communication between the photovoltaic component and the mounting clip. The serrated edge can be oriented along the Y-direction.

In some embodiments of the present invention, the base 190 can comprise one or more apertures for use in attaching the mounting clip 102 to a support structure. For example, a fastener, such as a bolt or screw, can be inserted through the aperture to attach the mounting clip to a supporting structure. This can allow for the mounting clips to be attached to a wide variety of supporting structures depending on the needs of a particular application.

As shown in FIGS. 23A-24D, in some embodiments of the present invention, the mounting clip 102 can further comprise one or more nesting flanges extending upwardly from the base to form an angle with the base that is about 90 degrees. The nesting flange can comprise a slot with an opening configured to receive at least a portion of a second mounting clip to detachably couple the first mounting clip to the second mounting clip. This arrangement can allow for photovoltaic components to be installed adjacent and proximate to each other by reducing the space needed between adjacent panels required in conventional systems.

Figure 2:
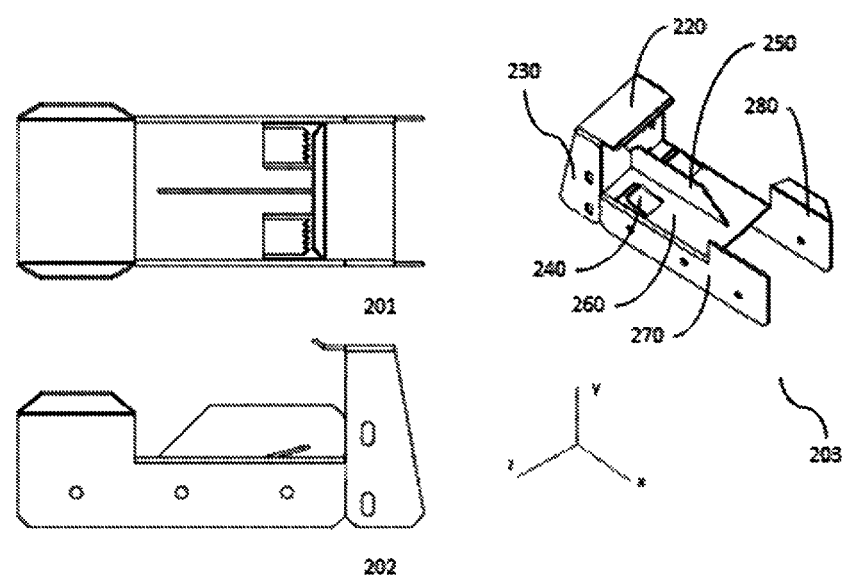
FIG. 2 provides a second mounting clip, in accordance with some exemplary embodiments of the present invention.

As shown in FIG. 2, an exemplary embodiment of the present invention also provides a second mounting clip. The second mounting clip 203 can removably attach one or more photovoltaic components to a supporting structure. The second mounting clip can comprise a base 260, a plurality of bonding tabs 240, at least one side flange 270, at least one lateral indexing tab 280, and a top cap flange 220.

In some embodiments, the base 260 can be generally planar as shown in the figures included herewith. The base can have a first side, an opposing second side, a first end, and an opposing second end. The base 190 can be configured to fit on top of a supporting structure. In some embodiments of the present invention, one or more bonding tabs can extend upwardly from the base between the first side and the second side. The bonding tabs can be spring bonding tabs and can form an angle with the base that is greater than 90 degrees and less than 180 degrees. In some embodiments of the present invention, the bonding tabs 240 can have a serrated edge serrated edge for gouging into at least a portion of a photovoltaic component to provide electrical and mechanical communication between the photovoltaic component and the mounting clip. The serrated edge can be oriented along the Y-direction. The spring bonding tabs 240 may retain movement of the one or more photovoltaic components in x-direction and y-direction when installed. Additionally, they may accommodate irregular curvature on the supporting structure, buffer impact and thermal expansion on some of the metallic components, and dampen vibration that may occur due to a variety of causes.

In some embodiments of the present invention, the top cap flange 220 can be substantially parallel with the base 260 and can be connected to the base via one or more wall flanges 230. The one or more wall flanges can extend upwardly from the base. The top cap flange 220 may be formed at a height configured to receive the one or more panels. The top cap flange 220 may prevents movement of the one or more panels in a y-direction. In some embodiments, the wall flanges 230 can be pivotably connected to the base to allow for a range of movement of the top cap flange 220 to fit a variety of sized and shaped photovoltaic components. In some embodiments of the present invention, the top cap flange can comprise one or more spring tabs extending downward from the top cap flange towards the base. When a photovoltaic component is attached to the mounting clip, the spring tabs can exert a force on a component to hold it in place. In some embodiments of the present invention, wall flanges 230 can comprise a serrated edge between the top cap flange and the base for gouging into at least a portion of a photovoltaic component to provide electrical and mechanical communication between the photovoltaic component and the mounting clip. The serrated edge can be oriented along the Z-direction.

In some embodiments of the present invention, the mounting clip can comprise one or more side flanges 270 that can extend upwardly from the sides of the base to form an angle with the base of about 90 degrees.

In some embodiments of the present invention, the mounting clip can comprise one or more lateral index tabs 280 that can extend outwardly from the side flanges 270. The lateral index tabs 280 can form an angle with the side flanges 270 that is greater than 90 degrees and less than 180 degrees. In some embodiments, the lateral index tabs 280 can be made of a spring grade material.

In some embodiments of the present invention, one or more attachment flanges can extend downwardly and away from the base 260 for use in removably attaching the mounting clip to the support structure. The one or more attachment flanges can be configured to interface with a portion of the support structure to removably attach the base to the support structure. For example, the one or more attachment flanges can interface with each side of a rail or strut channel, providing mechanical attachment of the first mounting clip 102 to the supporting structure.

In some embodiments of the present invention, the first mounting clip can comprise at least one central indexing tab 250. As shown in FIG. 2, the central indexing tab 250 can extend upwardly from the base 260 to form an angle with the base of about 90 degrees. In some embodiments, the central indexing tab 250 can divide the base in half between the first and second sides of the base. In some embodiments, however, the first mounting clip can contain multiple central indexing tabs 250 that can together divide the base in half between the first and second sides of the base. The central indexing tabs 250 may be configured to provide a lateral Y-direction indexing guide for installing each of the one or more panels. The central indexing tabs 250 may retain movement of the one or more panels in the Y-direction. In some embodiments of the present invention, the one of more central indexing tabs 250 can be central indexing spring tabs 250 made from a spring grade material.

In some embodiments of the present invention, the base 260 can comprise one or more apertures for use in attaching the mounting clip to a support structure. For example, a fastener, such as a bolt or screw, can be inserted through the aperture to attach the mounting clip to a supporting structure. This can allow for the mounting clips to be attached to a wide variety of supporting structures depending on the needs of a particular application.

As shown in FIG. 23A-24D, in some embodiments of the present invention, the base 260 can comprise one or more apertures configured to receive at least a portion of a nesting flange of a mounting clip to detachably couple the mounting clips. This arrangement can allow for photovoltaic components to be installed adjacent and proximate to each other by reducing the space needed between adjacent panels required in conventional systems.

Figure 3:
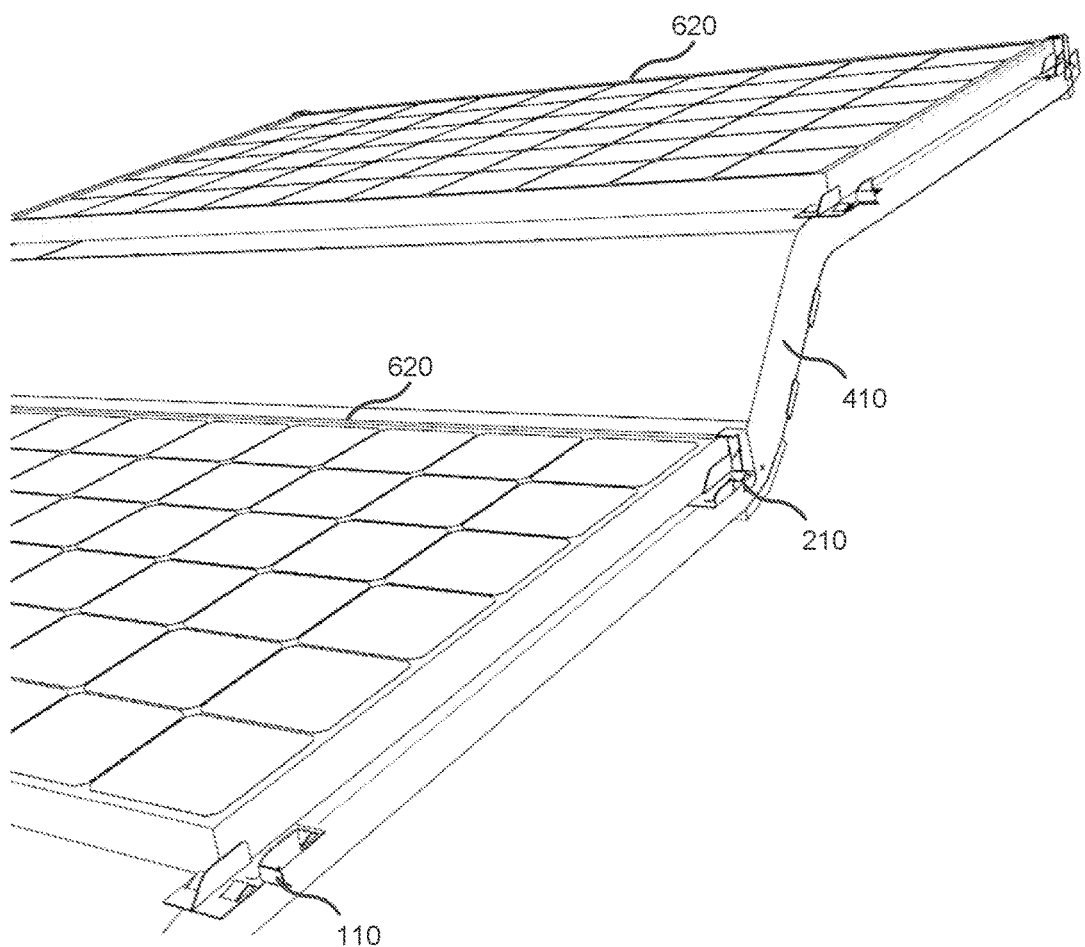
FIG. 3 provides a first mounting clip and a second mounting clip utilized to mount a plurality of photovoltaic panels to a bent beam structure, in accordance with some exemplary embodiments of the present invention.

FIG. 3 illustrates the first mounting clip and the second mounting clip utilized to mount a plurality of photovoltaic panels to a bent beam structure. Each of the photovoltaic panels 620 may be locked in to place on top of the bent beam structure 410 by the first mounting clip 110 and the second mounting clip 210.

Figure 4:
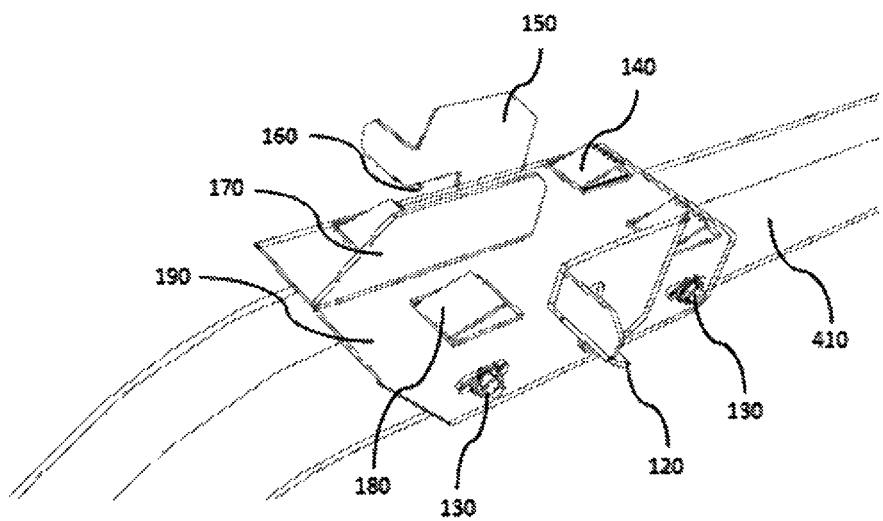
FIG. 4 provides a detail view of a first mounting clip removably bonded to a beam, in accordance with some exemplary embodiments of the present invention.

FIG. 4 shows a detail view of the first mounting clip removably bonded to the beam. A set of bolts 130 are used to bond the first mounting clip to the beam 410.

Figure 5:
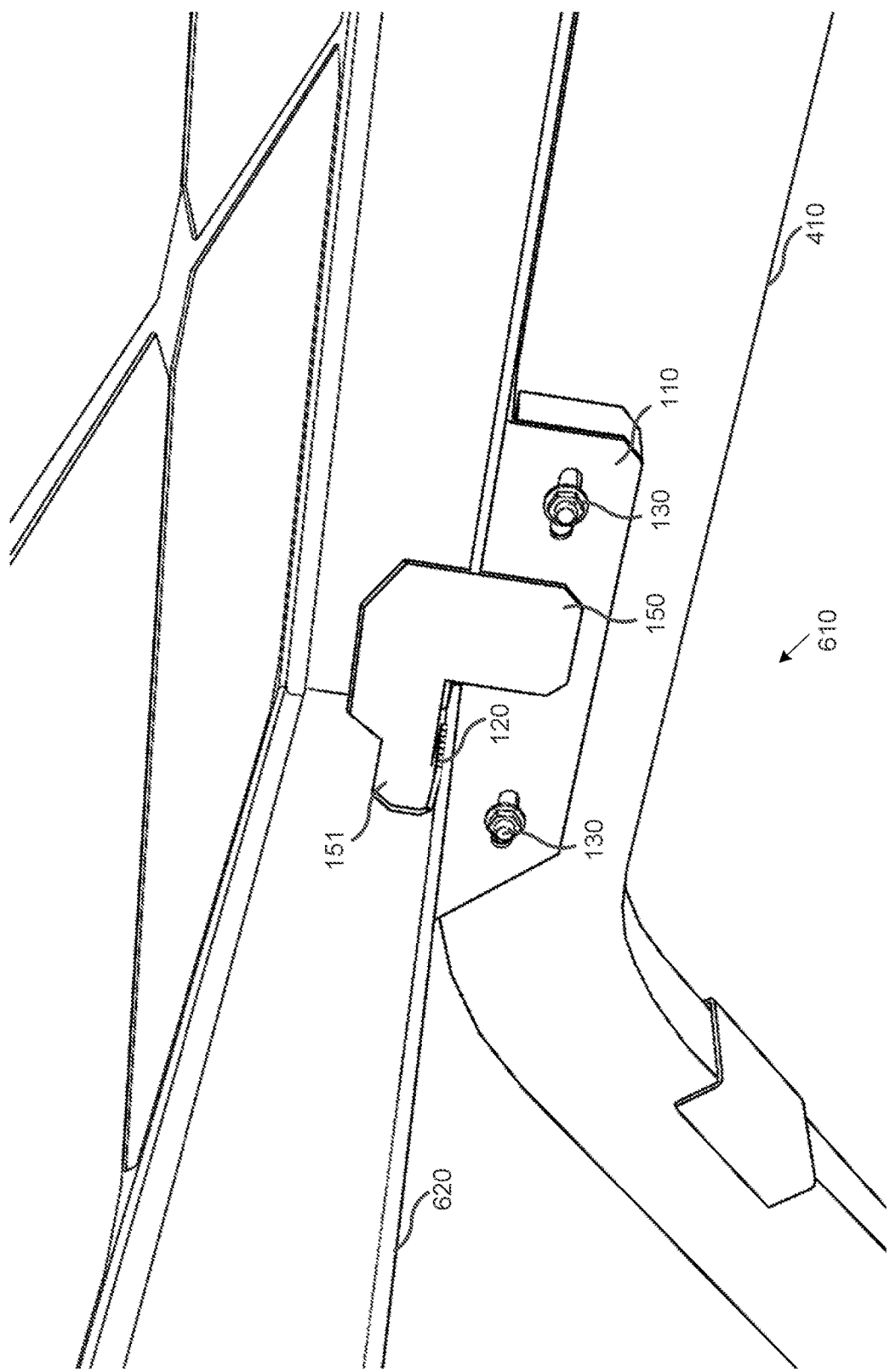
FIG. 5 provides a perspective view of a spring bonding flange at a bonding position, in accordance with some exemplary embodiments of the present invention.
Figure 6:
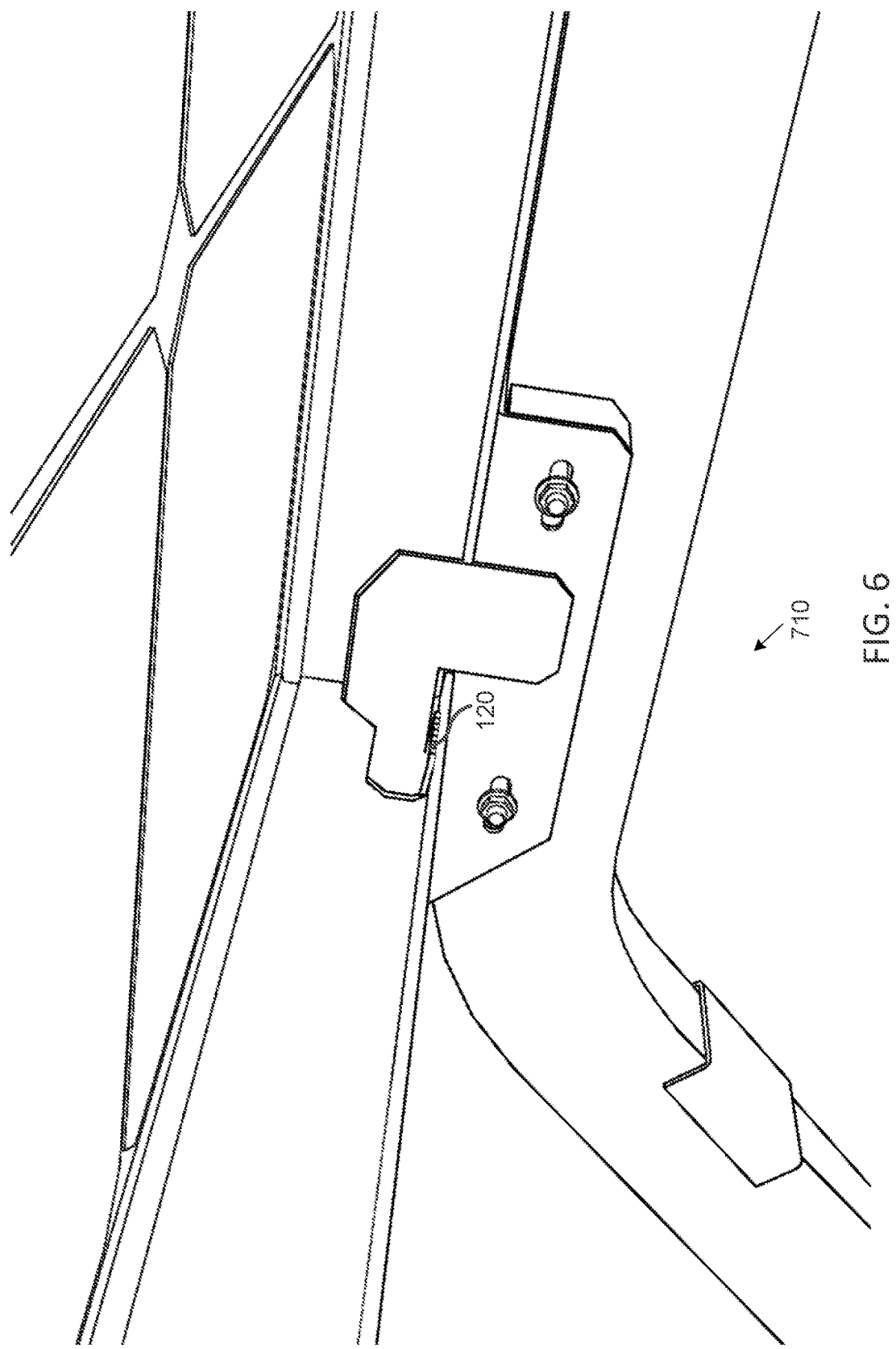
FIG. 6 provides another perspective view of a spring bonding flange at a bonding position, in accordance with some exemplary embodiments of the present invention.

FIGS. 5 and 6 shows a spring bonding flange at a bonding position. In FIG. 5, the spring bonding flange 120 is yet to make contact with the one or more panels 620 at position 610. In FIG. 6, the one or more panel is further pushed against the spring lever flange 151, the spring lever flange 151 prevents movement of the one or more panel 620 along the direction of a length of the beam 410. When pushed, the spring bonding flange 120 is seen making contact with the one or more panel at position 710, electrically bonding at the serrated edge of the spring bonding flange 120. The spring bonding flange 120 can be made of spring-like material to firmly make contact against the one or more panels.

Figure 7:
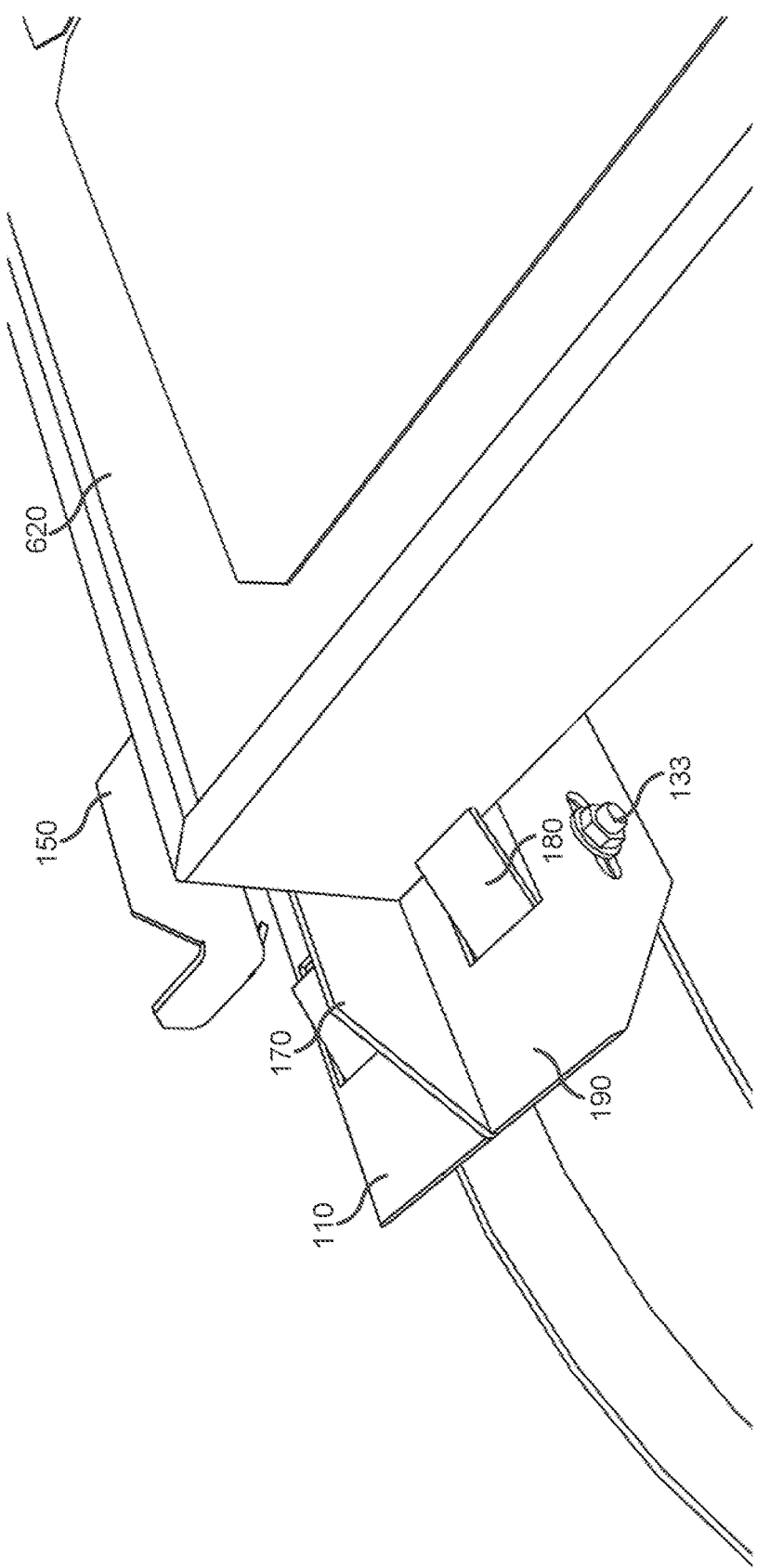
FIG. 7 provides a locking clip, in accordance with some exemplary embodiments of the present invention.

FIG. 7 shows an embodiment of one of the plurality of locking clips 180 retaining movement of the panel 620. The locking clip 180 is preventing movement of the panel 620 along a length of the beam. The central indexing tab 170 provides a guide to the panel 620 when slide against the locking clip 180.

Figure 8:
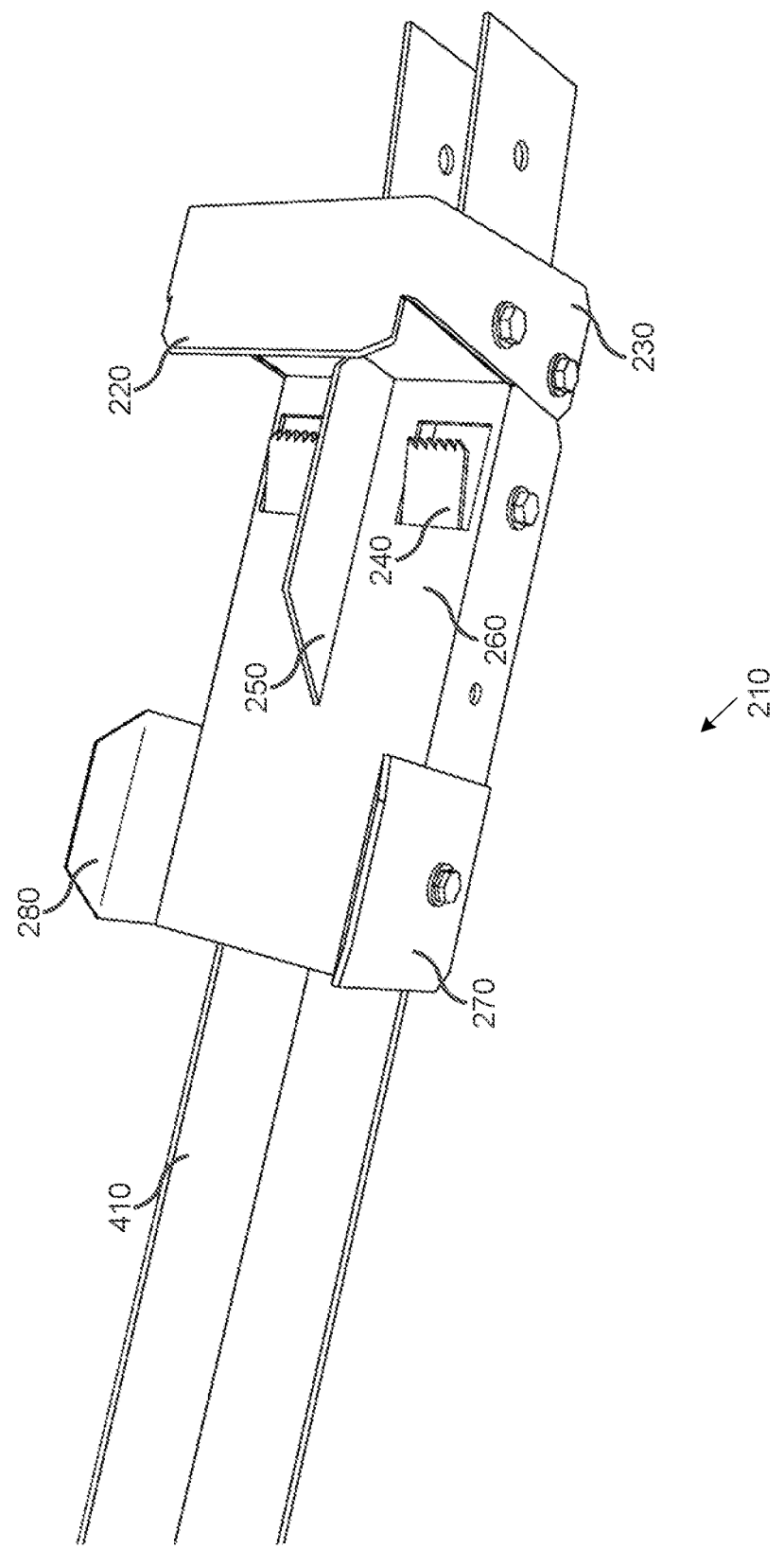
FIG. 8 provides a second mounting clip removably bonded, in accordance with some exemplary embodiments of the present invention.

FIG. 8 illustrates an embodiment of the second mounting clip removably bonded on top of the beam.

Figure 9:
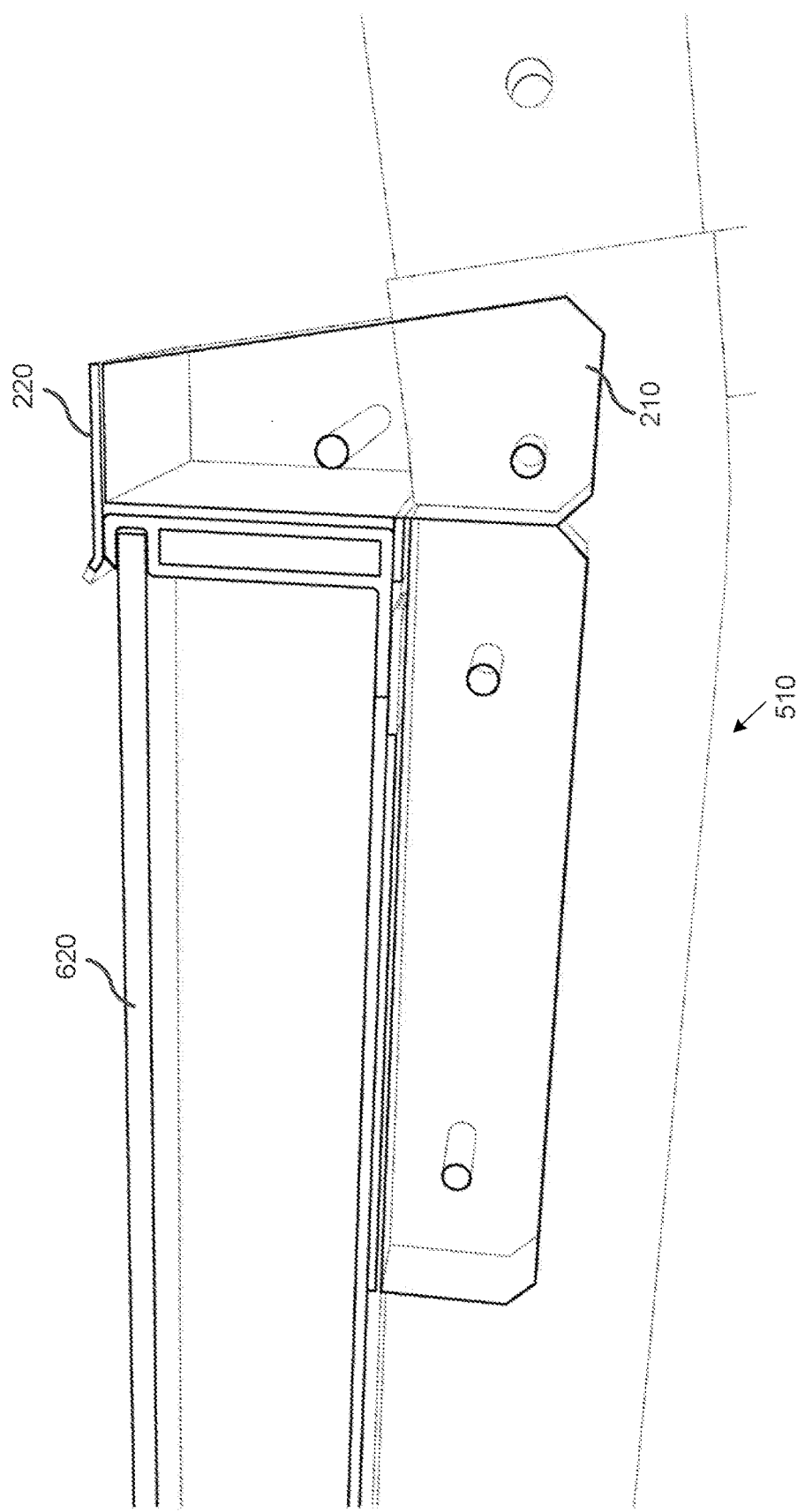
FIG. 9 provides a lengthwise cross section view of a removably bonded second mounting clip, in accordance with some exemplary embodiments of the present invention.

FIG. 9 shows a lengthwise cross section view 510 of the removably bonded second mounting clip of FIG. 8. The panel 620 is retained by the top cap flange 220, preventing detachment of the beam from the second mounting clip 210.

The bonding tabs 240 and indexing tabs 150 disclosed herein may be made of spring or the like flexible material accommodating any vibration of the photovoltaic panel that may occur due to wind or other causes.

Figure 10:
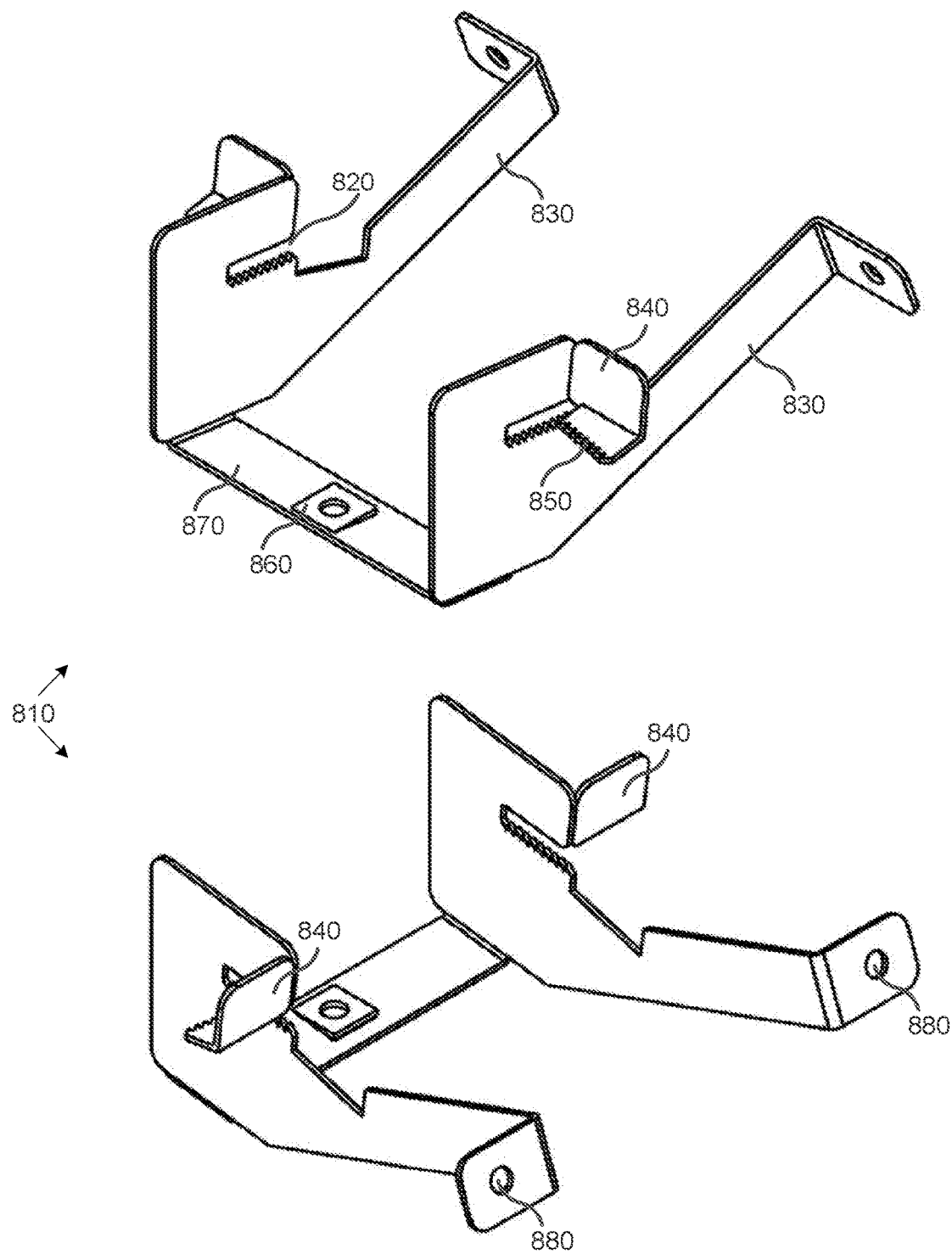
FIG. 10 provides a first lateral clip, in accordance with some exemplary embodiments of the present invention.

Now turning to FIG. 10, an embodiment of a first lateral clip is shown. The first lateral clip may removably attach one or more photovoltaic panel around a ballast. The first lateral clip may comprise a base 870, at least two flanges 830, a pair of slots 820, a pair of bearing tabs 840, and a pair of bonding teeth 850.

In one embodiment, the base 870 may have a width sized to fit at one end of the ballast.

In another embodiment, the at least two flanges 830 may be formed from the base 870 where each of the two flanges may further extend along a circumference of the ballast towards an opposite end of the ballast.

In a further embodiment, the pair of slots 820 may have an opening end formed near the one end of the ballast, each of the pair of slots 820 may be sized to receive one of the one or more photovoltaic panels. A part of each of the pair of slots 820 may form a serrated edge; the serrated edge may be configured to make contact with the one or more photovoltaic panels when attached.

In yet another embodiment, the pair of bearing tabs 840 may be formed contiguously from each of the two flanges 830. Each of the pair of bearing tabs 840 may be formed above the slot and extending outwardly away from the ballast.

The ballast contemplated herein may have a slope and made of material which may include, but not limited to, metals such as steel, stainless steel, aluminum, titanium, and the like; ceramic composites, composite reinforced metals, plastic and the like; and concrete, sand, and the like.

In a further embodiment, the pair of bonding teeth 850 may be formed at a lower edge of each of the pair of bearing tabs 840. The pair of bonding teeth 850 may further extend towards the base 870 where each of the pair of bonding teeth 850 may contact the one or more photovoltaic panels when attached.

In yet another embodiment, the at least two flanges 830 may further extend to wrap around the ballast providing a secure mounting of the first lateral clip to the ballast.

Figure 11:
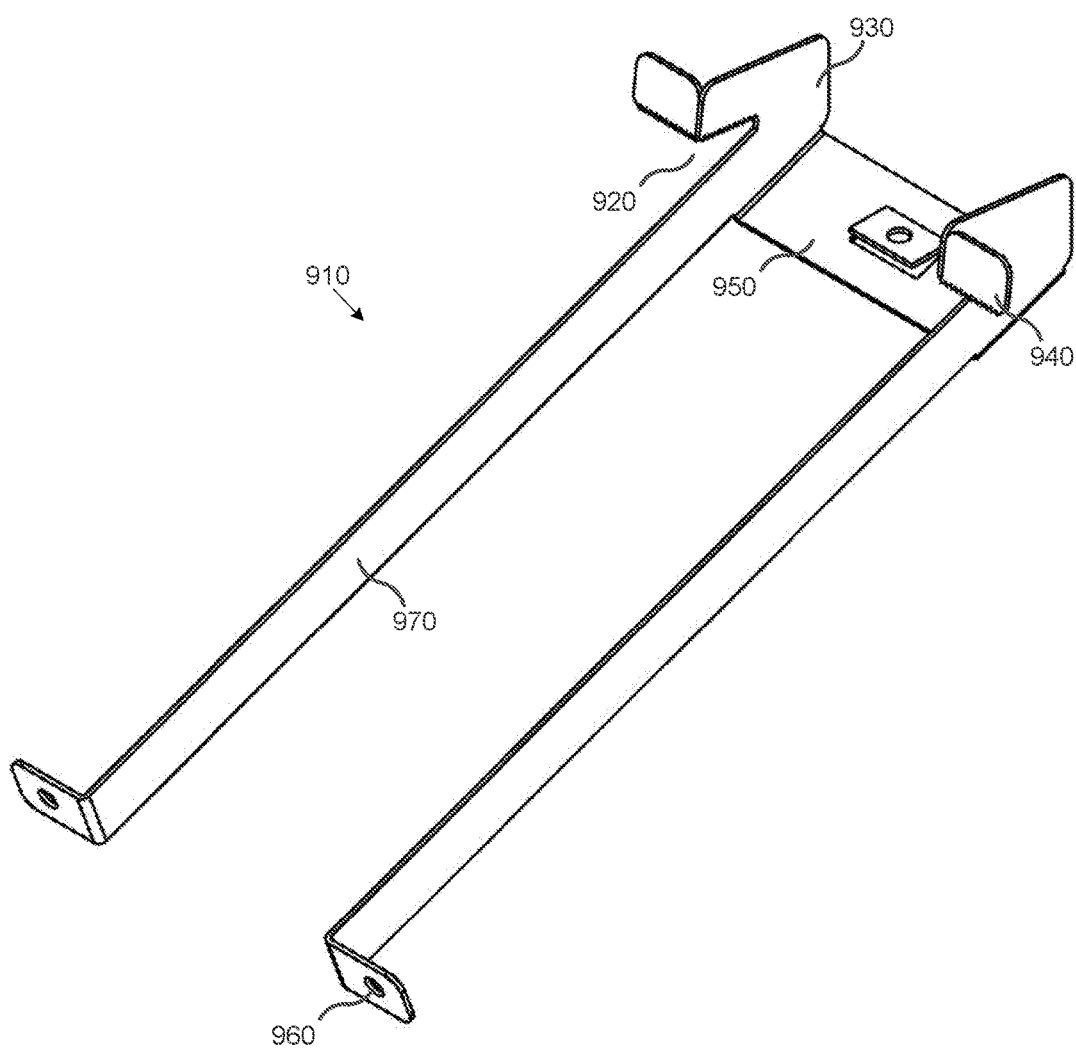
FIG. 11 provides a second lateral clip, in accordance with some exemplary embodiments of the present invention.

FIG. 11 shows an embodiment of a second lateral clip. The second lateral clip may attach one or more photovoltaic panels around a ballast. The second lateral clip may comprise a second base 950, at least two flanges 970, a pair of second slots 920, and a pair of second bearing tabs 940.

In one embodiment, the second base 950 may be constructed to have a second width where the second width may be sized to fit at one end of the ballast.

In another embodiment, the at least two flanges 970 may be formed from the second base and each of the two flanges 970 may extend along a circumference of the ballast towards an opposite end of the ballast.

In yet another embodiment, the two flanges 970 may mechanically fastened to the two flanges 830 of the first lateral clip hugging the ballast lengthwise.

In a further embodiment, the pair of second slots 920 may have an opening formed near the one end of the ballast. Each of the pair of second slots 920 may be configured to receive one of the one or more photovoltaic panels. A part of each of the pair of second slots 920 may have a serrated edge where the serrated edge may be configured to make contact with the one or more photovoltaic panels when attached.

In still another embodiment, the pair of second bearing tabs 940 may be formed contiguously from each of the two second flanges 970. Each of the pair of second bearing tabs 940 may be formed above the slot 920 and extending outwardly away from the ballast.

Figure 12:
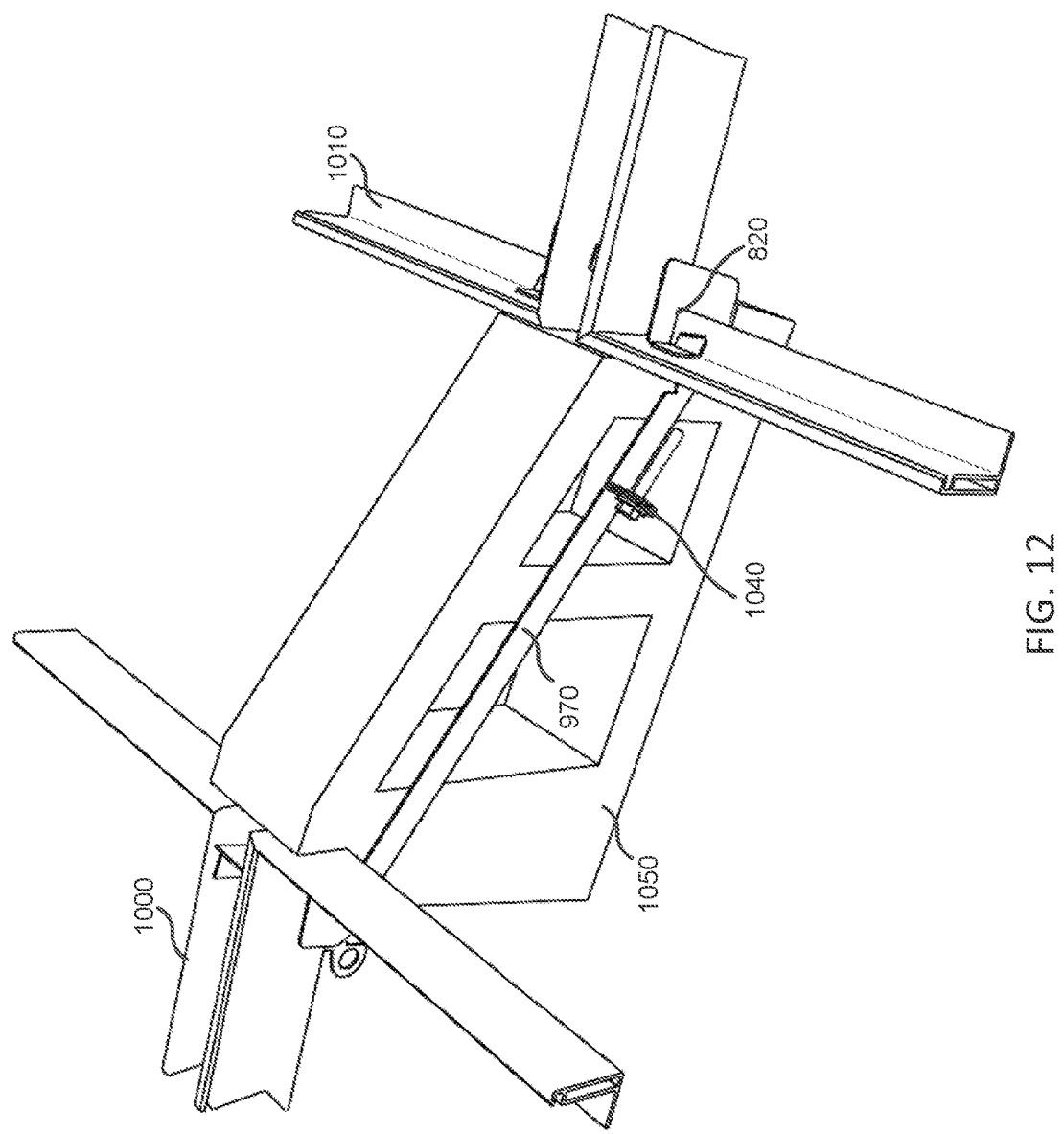
FIG. 12 provides a first lateral clip and a second lateral clip bonded to a ballast, in accordance with some exemplary embodiments of the present invention.
Figure 15A:
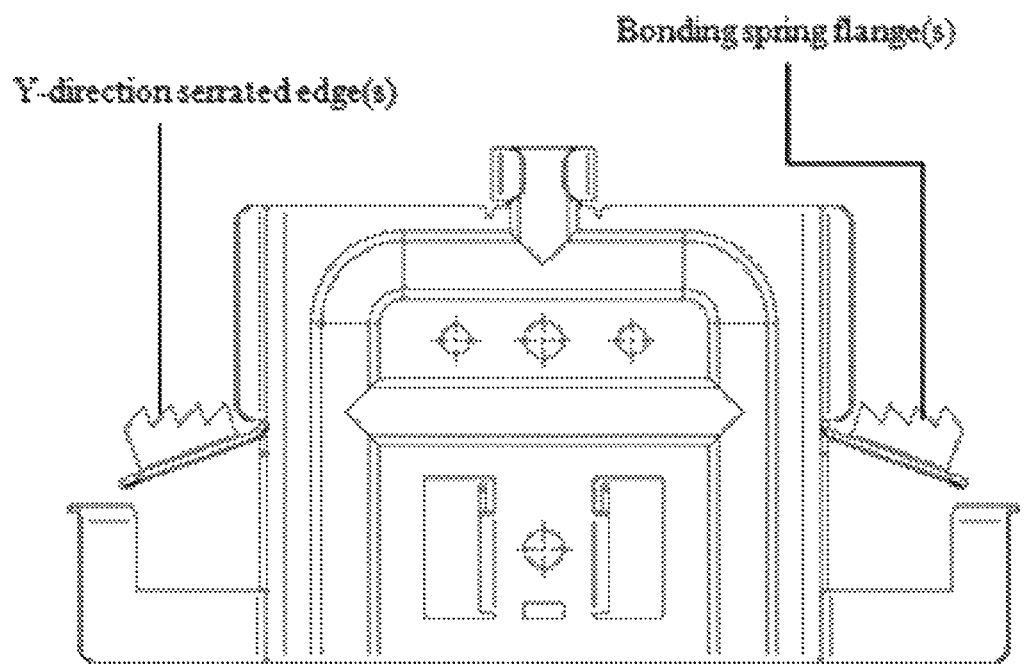
FIGS. 15A-15D provide various views of a first mounting clip, in accordance with some exemplary embodiments of the present invention.
Figure 15B:
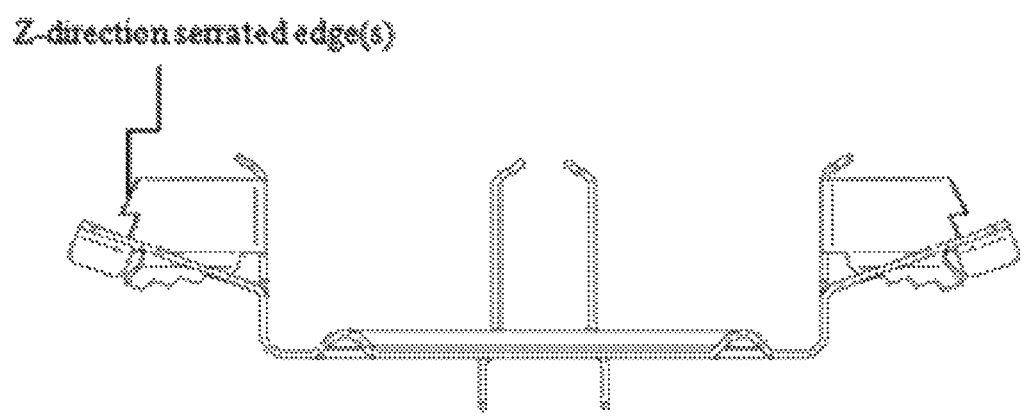
Figure 15C:
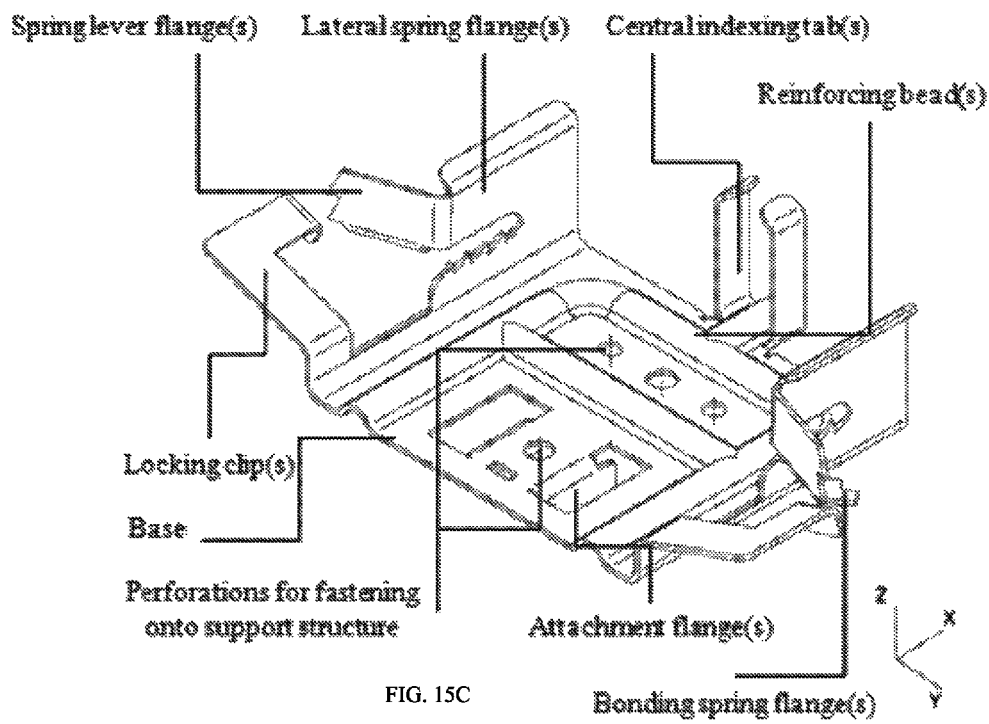
Figure 15D:
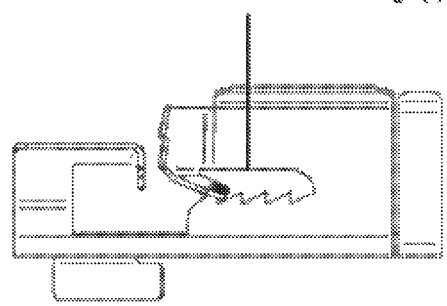
Figure 16A:
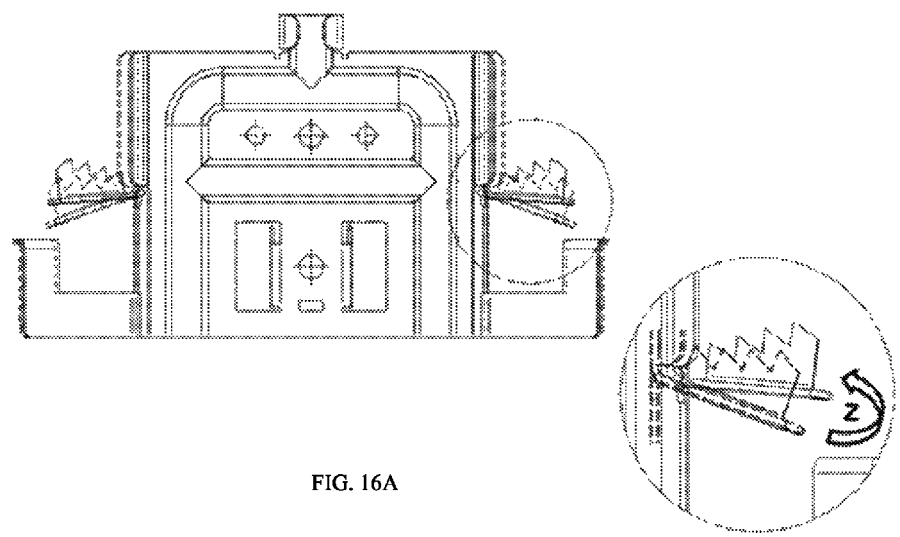
FIGS. 16A-16D provide various views of a first mounting clip, in accordance with some exemplary embodiments of the present invention.
Figure 16B:
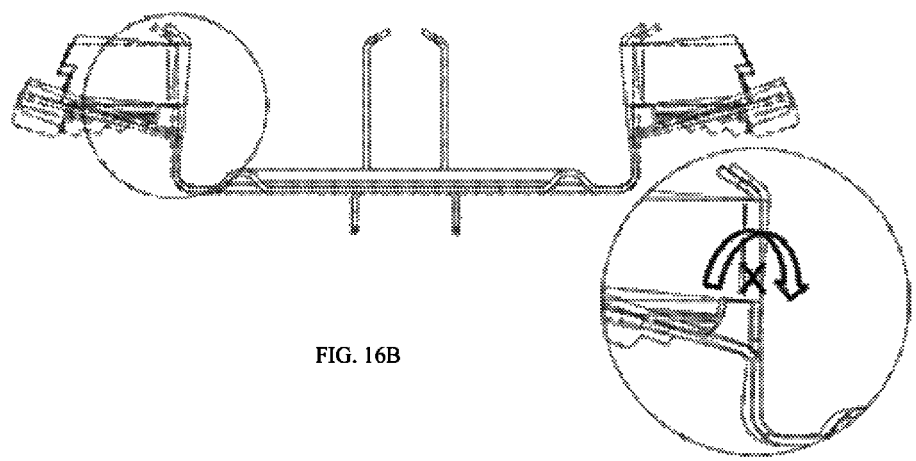
Figure 16C:
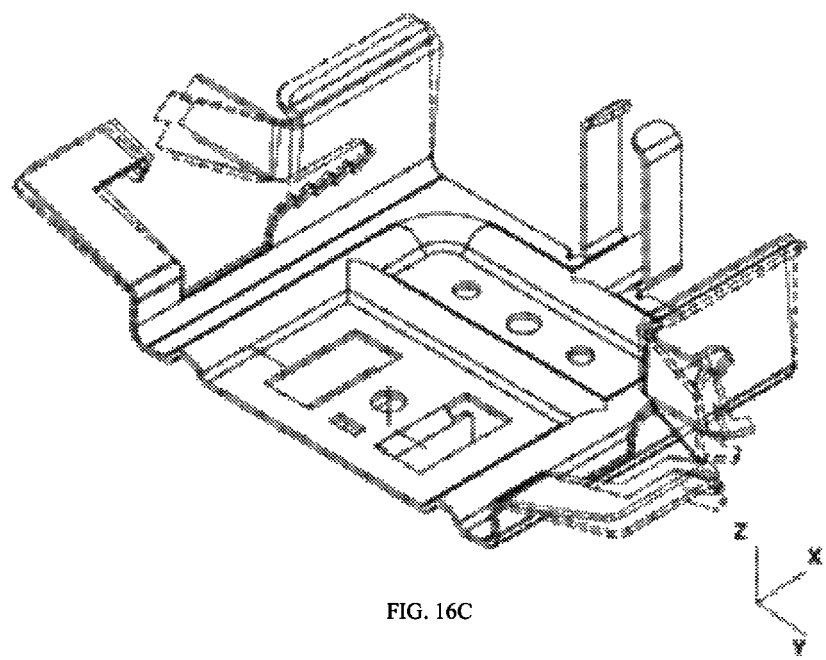
Figure 16D:
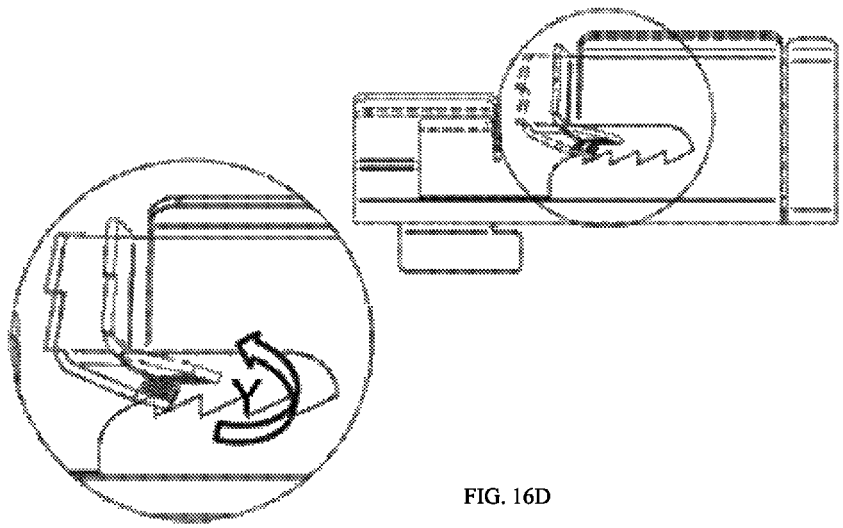
Figure 17A:
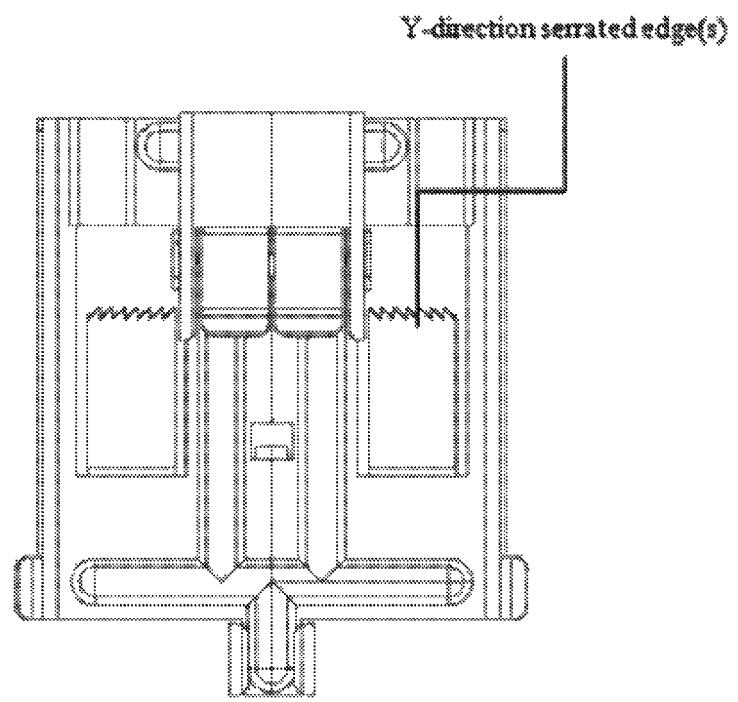
FIGS. 17A-17D provide various views of a second mounting clip, in accordance with some exemplary embodiments of the present invention.
Figure 17B:
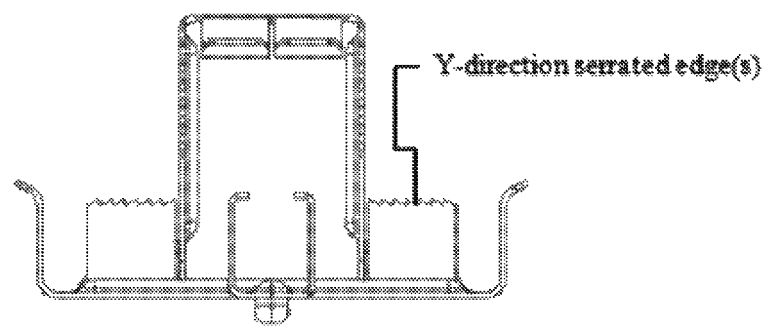
Figure 17C:
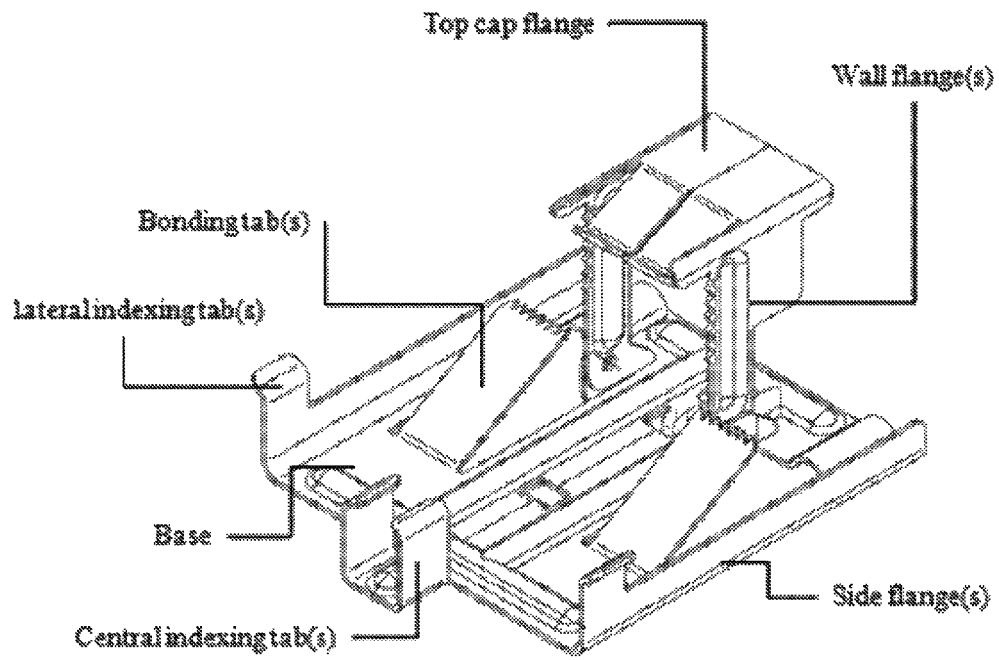
Figure 17D:
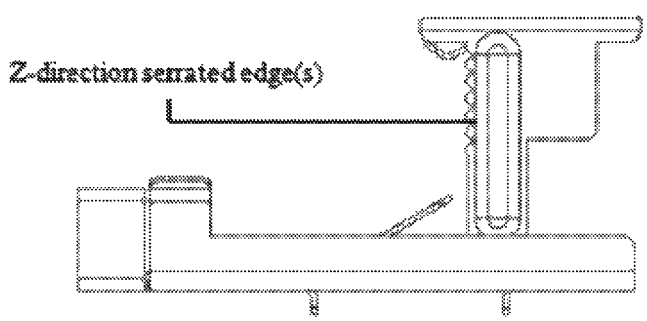
Figure 18A:
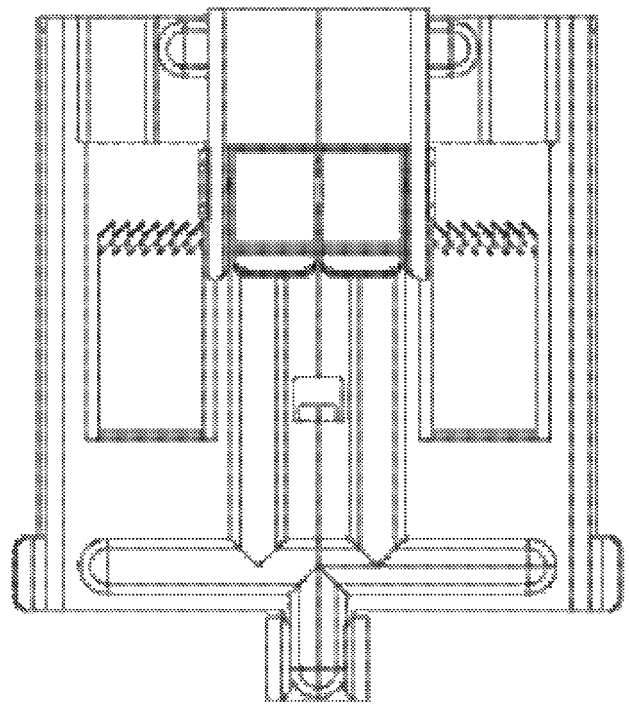
Figure 18B:
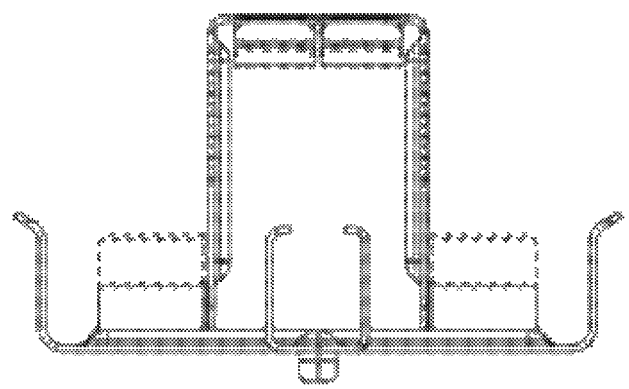
Figure 19A:
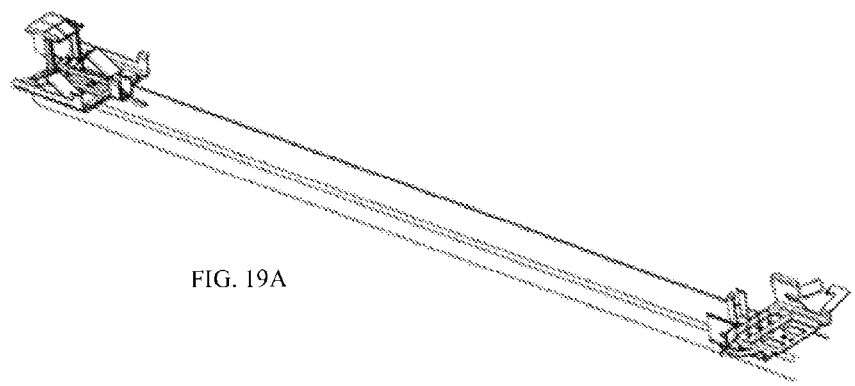
FIGS. 19A-19D provide various views illustrating attachment of mounting clips on a sloped rail, in accordance with some exemplary embodiments of the present invention.
Figure 19B:
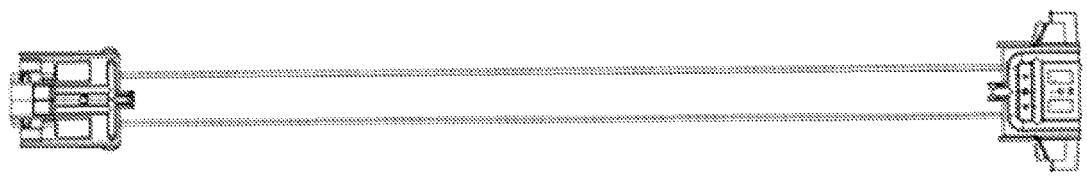
Figure 19C:
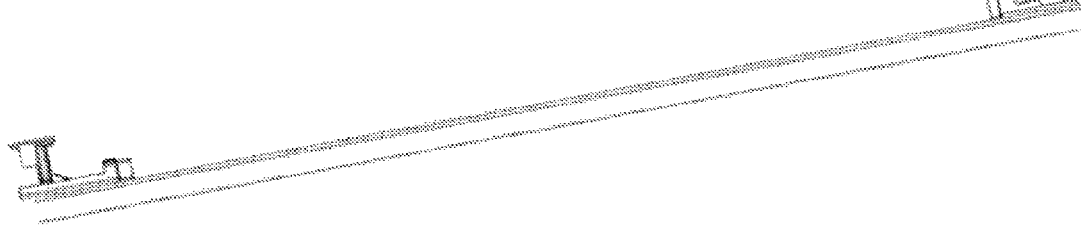
Figure 19D:
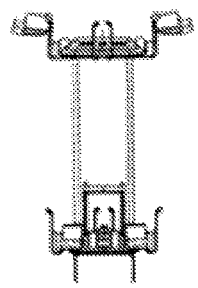
Figure 20A:
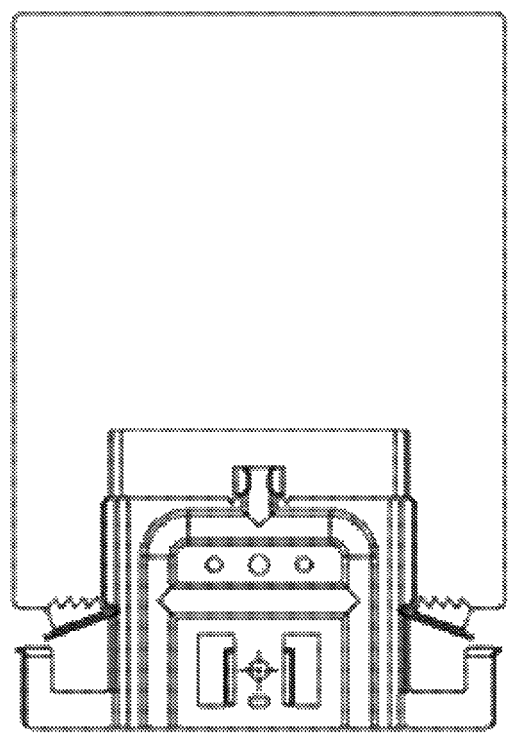
FIGS. 20A-20D provide various views of a first mounting clip attached to a micro-inverter by means of an adapter, in accordance with some exemplary embodiments of the present invention.
Figure 20B:
Figure 20C:
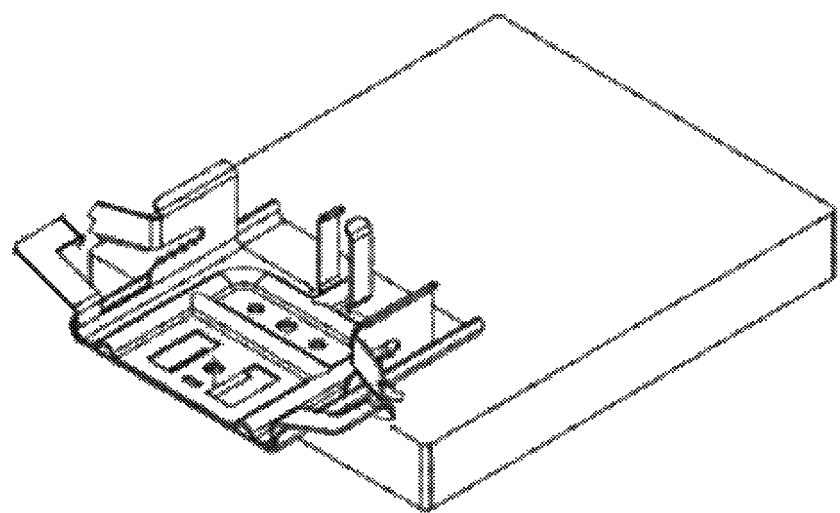
Figure 20D:
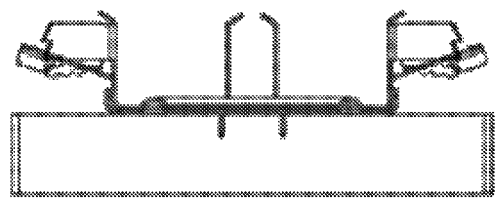
Figure 21A:
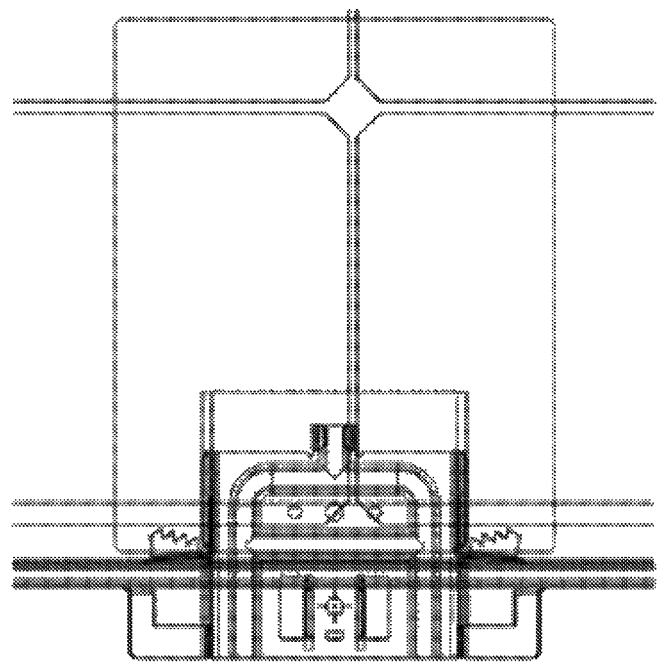
FIGS. 21A-21D provide various views of a micro-inverter mechanically attached and electrically bonded to a frame of a photovoltaic component with a first mounting clip, in accordance with some exemplary embodiments of the present invention.
Figure 21B:
Figure 21C:
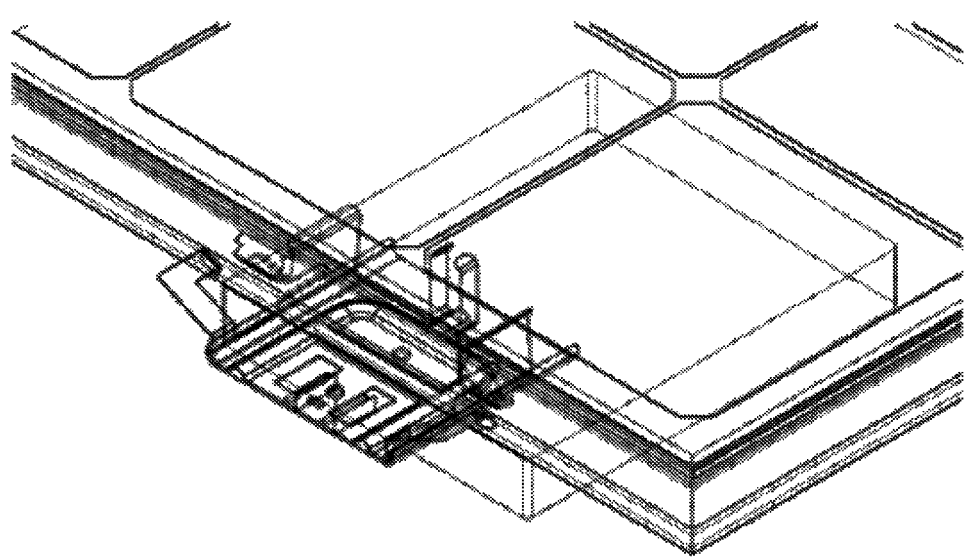
Figure 21D:
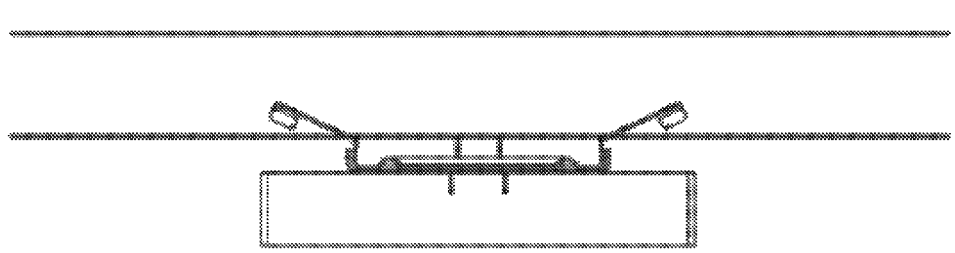
Figure 22A:
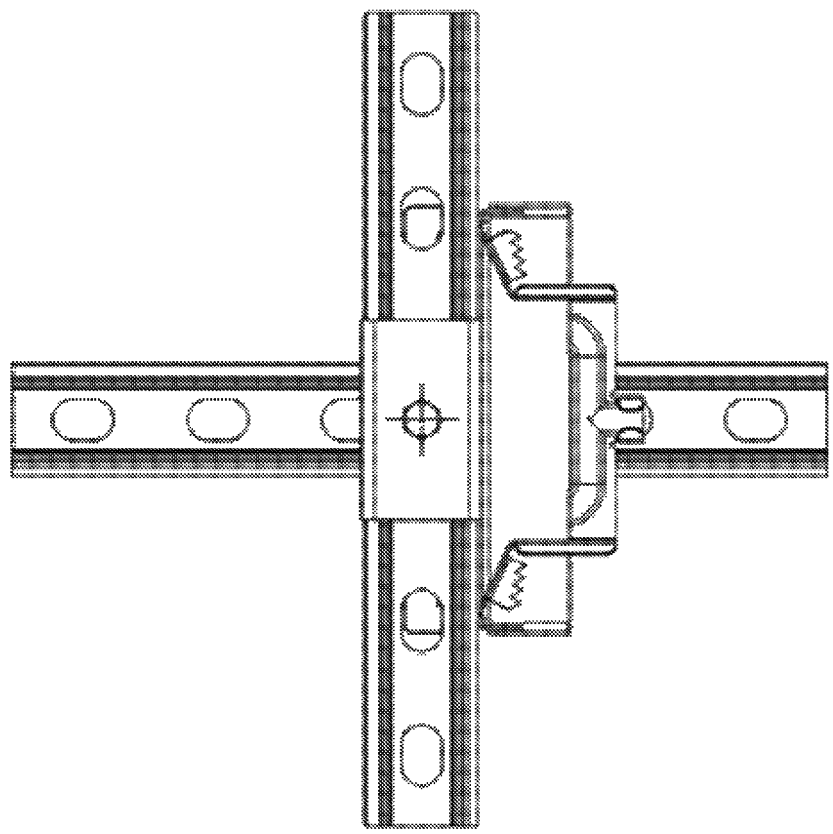
FIGS. 22A-22D provide various views of two strut channels connected together with a first mounting clip and an adapter pre-assembled on the base strut, in accordance with some exemplary embodiments of the present invention.
Figure 22B:
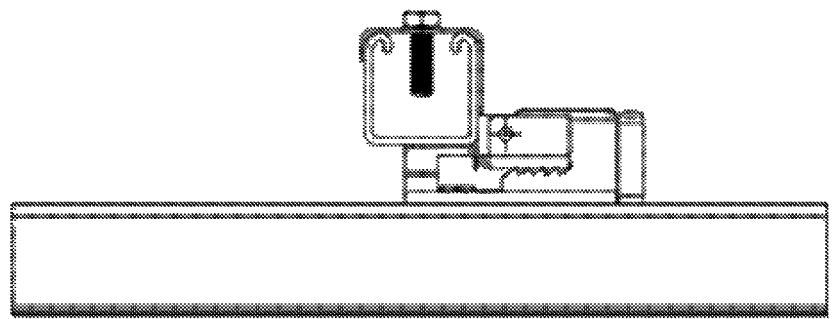
Figure 22C:
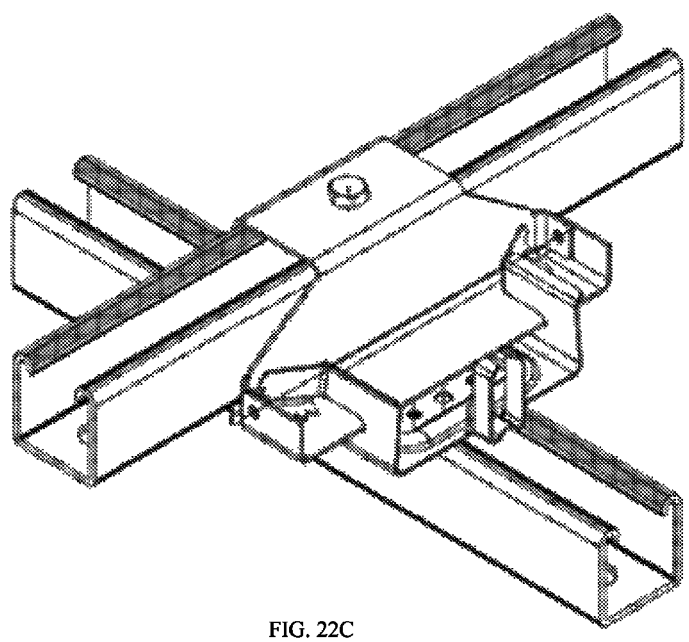
Figure 22D:
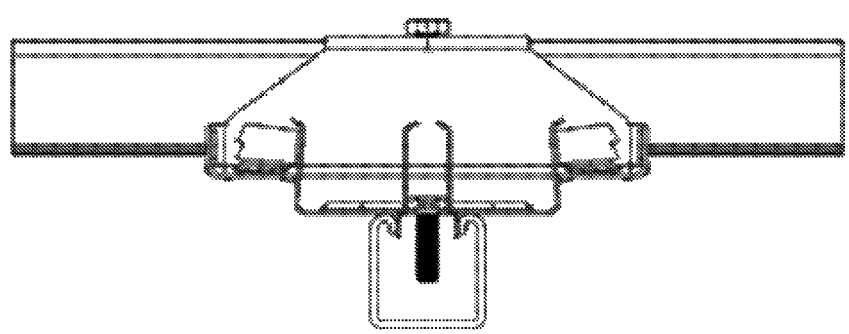
Figure 23A:
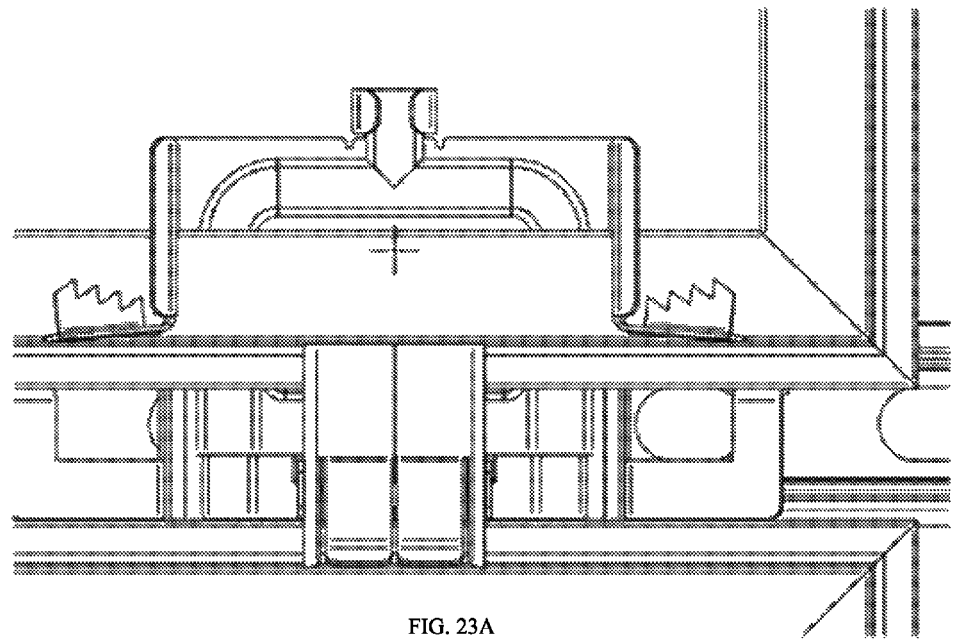
FIGS. 23A-23D provide various views of a first mounting clip and a second mounting clip nested together to connect two photovoltaic components, in accordance with some exemplary embodiments of the present invention.
Figure 23B:
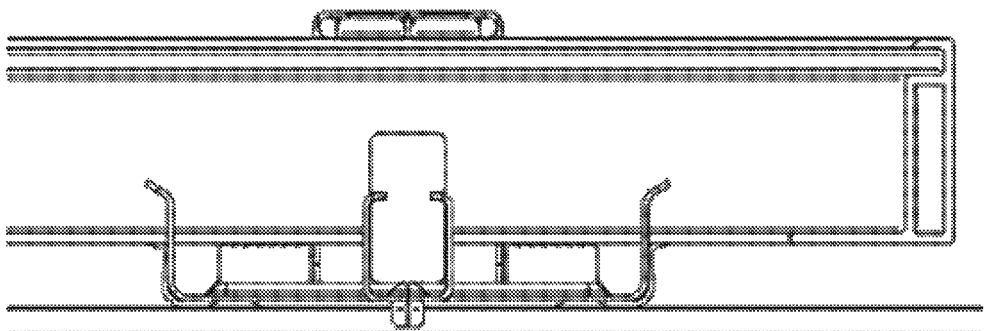
Figure 23C:
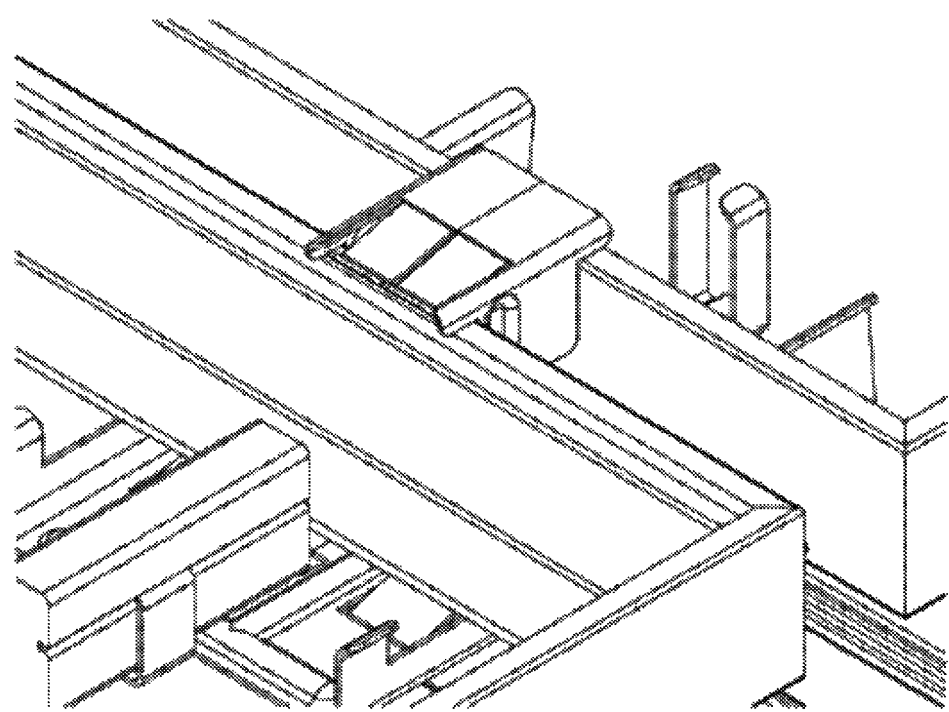
Figure 23D:
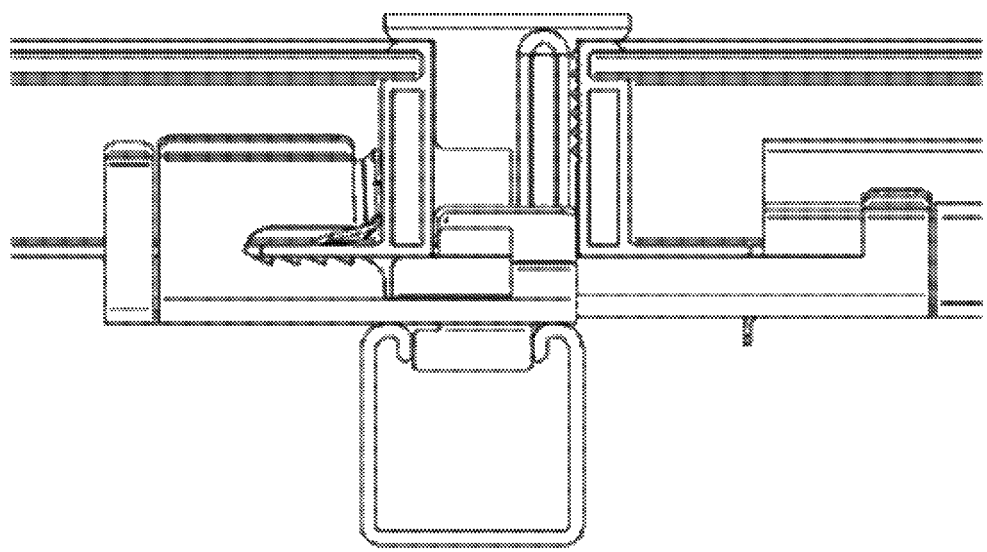
Figure 24A:
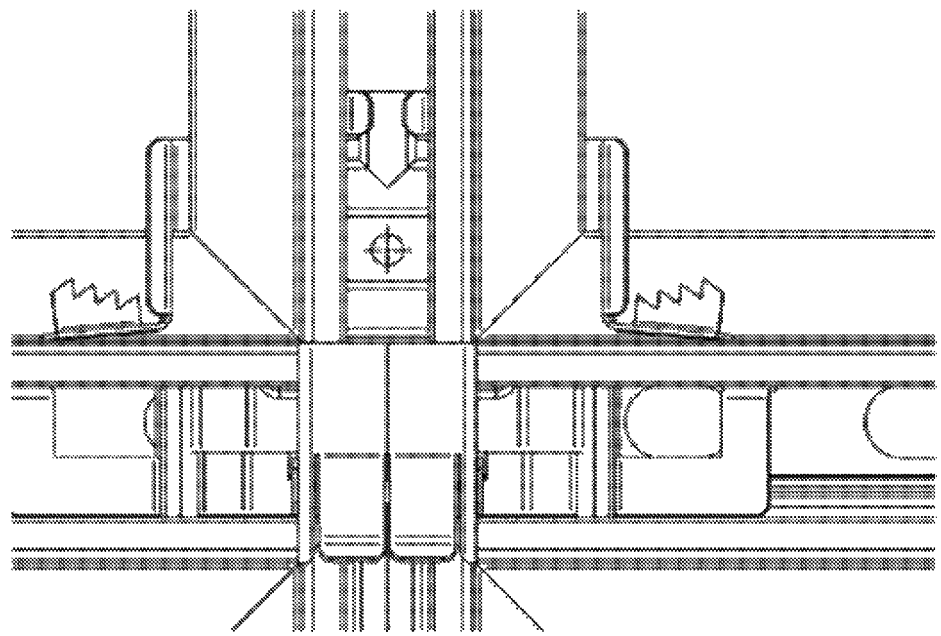
FIGS. 24A-24D provide various views of a first mounting clip and a second mounting clip nested together to connect four photovoltaic components, in accordance with some exemplary embodiments of the present invention.
Figure 24B:
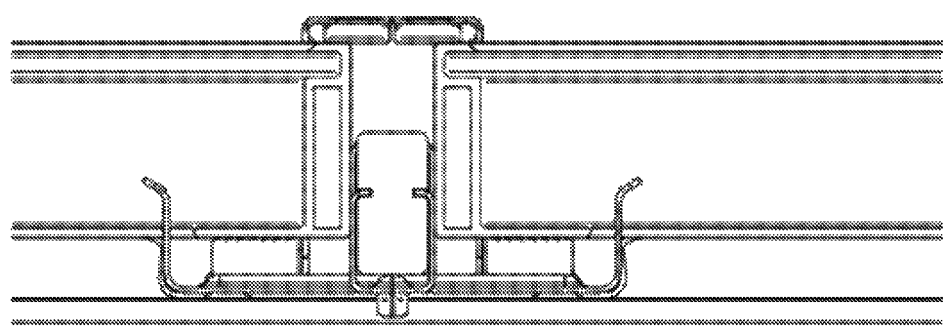
Figure 24C:
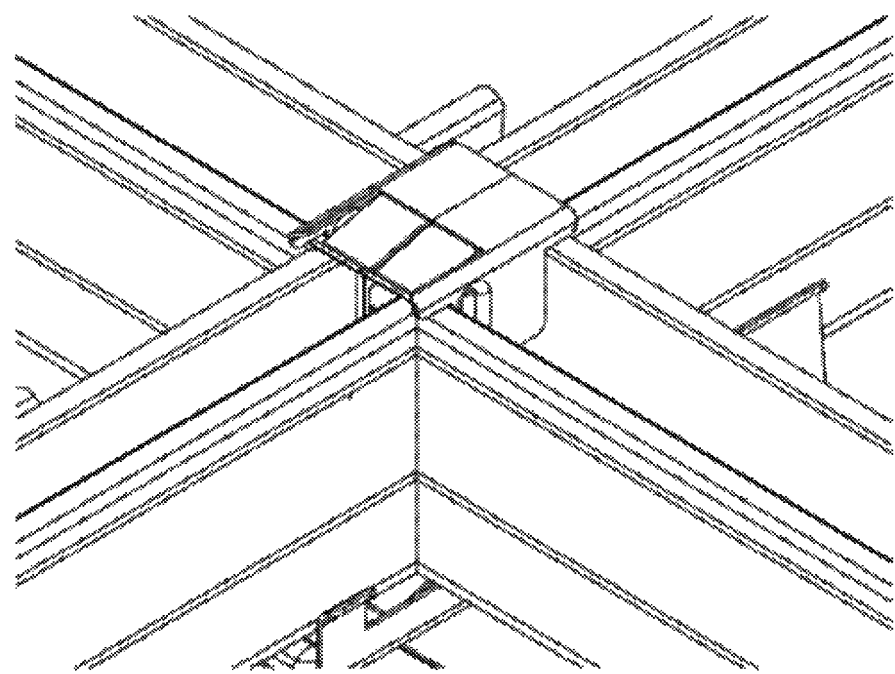
Figure 24D:
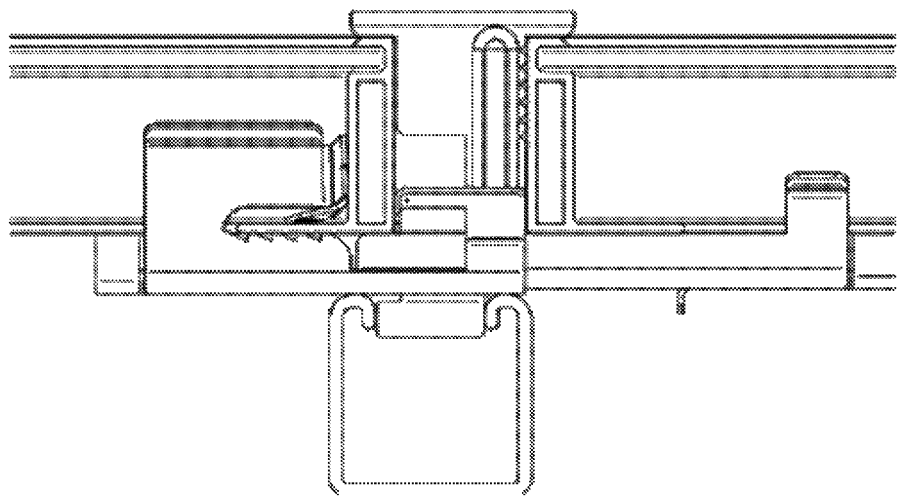
Figure 25A:
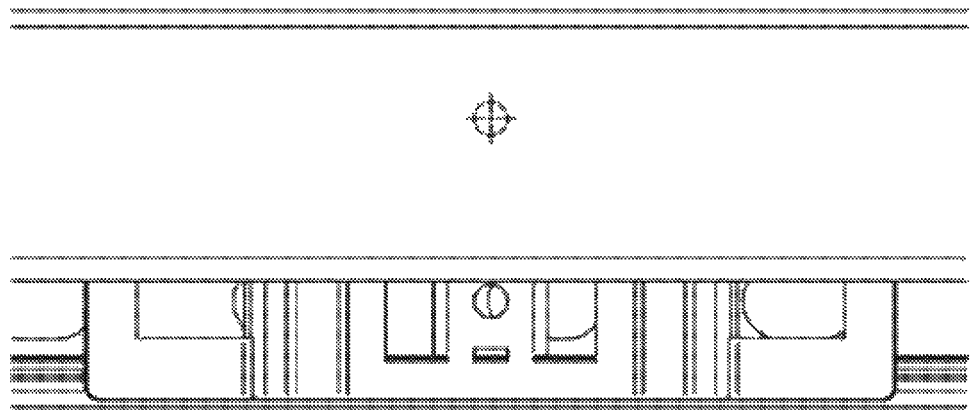
FIGS. 25A-25D provide various views of a wind deflector being mechanically attached and electrically bonded to a strut with a first mounting clip, in accordance with some exemplary embodiments of the present invention.
Figure 25B:
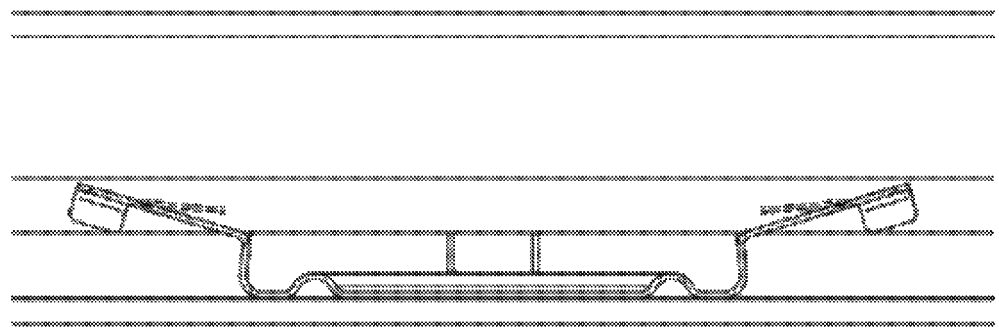
Figure 25C:
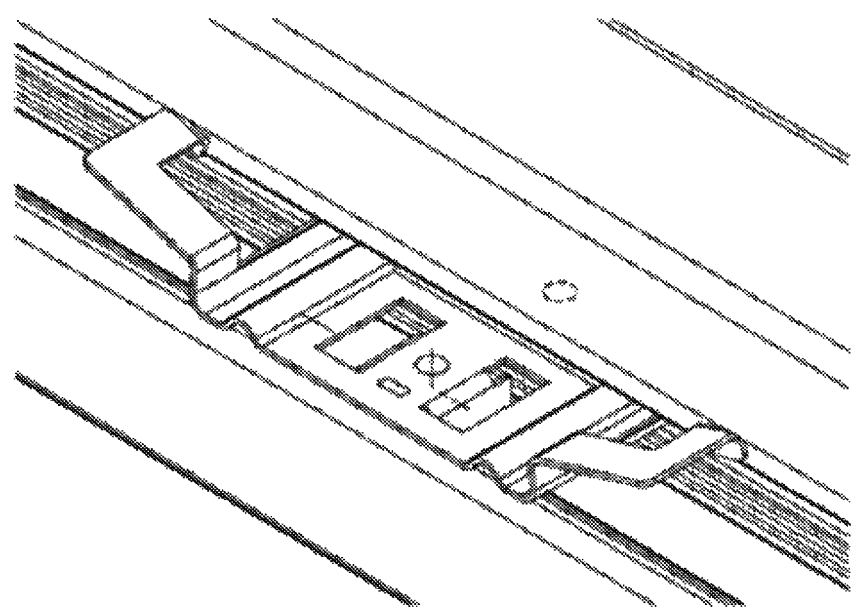
Figure 25D:
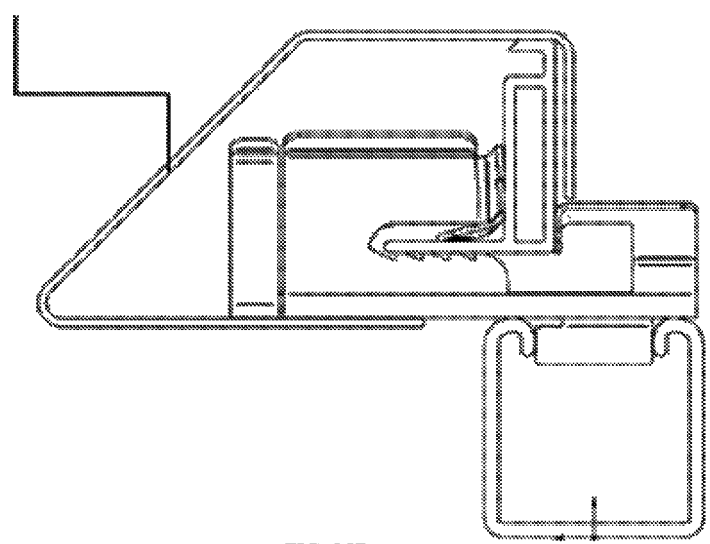

FIG. 12 shows an embodiment of the first lateral clip and the second lateral clip bonded to the ballast 1050. The schematic views of the one or more photovoltaic panels 1000, 1010 are presented. The first clip is attached at a lower end of the ballast face while the second clip is attached at a higher end of the ballast. The two clips are mechanically bonded at 1040 by a fastener. One of the pair of slots 820 are wedged against the one of the photovoltaic panel. One of the pair of bearing tabs and one of the pair of bonding teeth are preventing movement of mounted photovoltaic panel.

FIG. 13 illustrates an embodiment of the first lateral clip and the second lateral clip mechanically fastened together and mounted to the ballast.

FIG. 14 shows another embodiment of the first lateral clip mounting one of the photovoltaic panels to the ballast. One of the pair of bearing tabs 840 and one of the pair of slots 820 prevents movement of the mounted photovoltaic panel in any directions. The base 870 is wedged against the ballast 1130 providing secure mounting of the photovoltaic panel.

The bearing tabs 840 and second bearing tabs 940 disclosed herein may be made of spring or the like flexible material accommodating any vibration of the photovoltaic panel that may occur due to wind or other causes.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions Furthermore, the purpose of the foregoing Abstract is to enable the receiving office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A first mounting clip for removably attaching one or more panels to a supporting structure, comprising:
   a generally planar base having a first side and an opposing second side;
   a plurality of spring locking clips extending upwardly from the base forming an angle with the base that is greater than 90 degrees and less than 180 degrees;
   a first lateral flange extending upwardly from a first side of the base, the first lateral flange comprising a first slot having an opening configured to receive at least a portion of one of the one or more panels;
   a second lateral flange extending upwardly from a second side of the base, the second lateral flange comprising a second slot having an opening configured to receive at least a portion of one of the one or more panels;
   a first lever flange extending outwardly from the first lateral flange for providing x-direction guide for attaching the one or more panels;
   a second lever flange extending outwardly from the second lateral flange for providing x-direction guide for attaching the one or more panels;
   a first spring bonding flange extending downwardly from the first lever flange and forming an angle with the first lever flange that is greater than 90 degrees and less than 180 degrees, the first spring bonding flange for providing z-direction guide for attaching the one or more panels, wherein at least a portion of the first spring bonding flange comprises a serrated edge for gouging at least a portion of the one or more panels when the one or more panels are attached to the first mounting clip to electrically and mechanically couple the one or more panels to the first mounting clip; and
   a second spring bonding flange extending downwardly from the second lever flange and forming an angle with the second lever flange that is greater than 90 degrees and less than 180 degrees, the second spring bonding flange for providing z-direction guide for attaching the one or more panels, wherein at least a portion of the second spring bonding flange comprises a serrated edge for gouging at least a portion of the one or more panels when the one or more panels are attached to the first mounting clip to electrically and mechanically couple the one or more panels to the first mounting clip.

2. The first mounting clip of claim 1, wherein one or more of the plurality of spring locking clips have a serrated edge for gouging at least a portion of the one or more panels.

3. The first mounting clip of claim 1, wherein the first mounting clip is made of a single sheet of material.

4. The first mounting clip of claim 1, wherein the first mounting clip is made of a single sheet of spring material.

5. The first mounting clip of claim 1, wherein the first mounting clip is made of an electrically conductive material and is configured to provide a grounding path from the one or more panels through the supporting structure.

6. The first mounting clip of claim 1, wherein the first lateral flange is a first lateral spring flange that extends upwardly from a first side of the base to form an angle with the base that is greater than 90 degrees and less than 180 degrees, and
   wherein the second lateral flange is a second lateral spring flange that extends upwardly from the second side of the base to form an angle with the base that is greater than 90 degrees and less than 180 degrees.

7. The first mounting clip of claim 1, wherein the first lever flange is a first spring lever flange that extends outwardly from the first lateral flange to form an angle with the first lateral flange that is greater than 90 degrees and less than 180 degrees, and
wherein the second lever flange is a second spring lever flange that extends outwardly from the second lateral flange to form an angle with the second lateral flange that is greater than 90 degrees and less than 180 degrees.

8. The first mounting clip of claim 1, wherein at least a portion of the first spring lever flange and the second spring lever flange comprises a serrated edge for gouging at least a portion of the one or more panels when the one or more panels are attached to the first mounting clip.

9. The first mounting clip of claim 1, wherein at least a portion of the first slot and the second slot comprises a serrated edge for gouging at least a portion of the one or more panels when the one or more panels are attached to the first mounting clip.

10. The first mounting clip of claim 1, further comprising at least one central indexing tab extending upwardly from the base to form an angle with the base of about 90 degrees, the at least one central indexing tab providing a y-direction indexing guide for attaching the one or more panels.

11. The first mounting clip of claim 1, further comprising at least two attachment flanges extending downwardly from the base, each of the attachment flanges configured to interface with a portion of the supporting structure to removably attach the base to the supporting structure.

12. The first mounting clip of claim 1, wherein the base comprises at least one aperture configured to receive a fastener for connecting the mounting clip to the support structure.

13. The first mounting clip of claim 1, further comprising at least one nesting flange extending upwardly from the base to form an angle with the base that is about 90 degrees, the at least one nesting flange comprising a third slot with an opening configured to receive at least a portion of a second mounting clip to detachably couple the first mounting clip to the second mounting clip.

14. A first mounting clip for removably attaching one or more panels to a supporting structure, comprising:
a generally planar base having a first side and an opposing second side;
a plurality of spring locking clips extending upwardly from the base forming an angle with the base that is greater than 90 degrees and less than 180 degrees;
a first lateral spring flange extending upwardly from a first side of the base to form an angle with the base that is greater than 90 degrees and less than 180 degrees, the first lateral flange comprising a first slot having an opening configured to receive at least a portion of one of the one or more panels, at least a portion of the first slot comprising a serrated edge extending along the x-direction for gouging at least a portion of the one or more panels when the one or more panels are attached to the first mounting clip;
a second lateral spring flange extending upwardly from a first side of the base to form an angle with the base that is greater than 90 degrees and less than 180 degrees, the second lateral flange comprising a second slot having an opening configured to receive at least a portion of one of the one or more panels, at least a portion of the second slot comprising a serrated edge extending along the x-direction for gouging at least a portion of the one or more panels when the one or more panels are attached to the first mounting clip;
a first spring lever flange extending outwardly from the first lateral spring flange to form an angle with the first lateral spring flange that is greater than 90 degrees and less than 180 degree, the first spring lever flange comprising a serrated edge extending along the z-direction for gouging at least a portion of the one or more panels when the one or more panels are attached to the first mounting clip;
a second spring lever flange extending outwardly from the second lateral spring flange to form an angle with the second lateral spring flange that is greater than 90 degrees and less than 180 degree, the second spring lever flange comprising a serrated edge extending along the z-direction for gouging at least a portion of the one or more panels when the one or more panels are attached to the first mounting clip;
a first spring bonding flange extending downwardly from the first lever flange and forming an angle with the first lever flange that is greater than 90 degrees and less than 180 degrees, the first spring bonding flange for providing z-direction guide for attaching the one or more panels, wherein at least a portion of the first spring bonding flange comprises a serrated edge for gouging at least a portion of the one or more panels when the one or more panels are attached to the first mounting clip to electrically and mechanically couple the one or more panels to the first mounting clip; and
a second spring bonding flange extending downwardly from the second lever flange and forming an angle with the second lever flange that is greater than 90 degrees and less than 180 degrees, the second spring bonding flange for providing z-direction guide for attaching the one or more panels, wherein at least a portion of the second spring bonding flange comprises a serrated edge for gouging at least a portion of the one or more panels when the one or more panels are attached to the first mounting clip to electrically and mechanically couple the one or more panels to the first mounting clip,
wherein the first mounting clip is made of a single sheet of electrically-conductive material.

15. A second mounting clip for removably attaching one or more panels to a supporting structure, comprising:
a generally planar base having a first side, an opposing second side, a first end, and an opposing second end;
a plurality of bonding tabs extending upwardly from the base between the first side and the second side, the plurality of bonding tabs forming an angle with the base that is greater than 90 degrees and less than 180 degrees;
a top cap flange substantially parallel with the base, the top cap flange connected to the base via pair of wall flanges extending upwardly from the base proximate the first end of the base;
a first side flange extending upwardly from the first side of the base to form an angle with the base of about 90 degrees;
a second side flange extending upwardly from the second side of the base to form an angle with the base of about 90 degrees;
a first lateral index tab extending outwardly from the first side flange proximate the second end of the base for providing y-direction alignment guide for attaching the one or more panels, the first lateral index tab forming an angle with the first side flange that is greater than 90 degrees and less than 180 degrees; and
a second lateral index tab extending outwardly from the second side flange proximate the second end of the base for providing y-direction alignment guide for attaching the one or more panels, the second lateral index tab forming an angle with the second side flange that is greater than 90 degrees and less than 180 degrees, wherein the second mounting clip is configured to receive at least a portion of the one or more panels between the base and the top cap flange.

16. The second mounting clip of claim 15, wherein one or more of the plurality of bonding tabs have a serrated edge along the y-direction for gouging at least a portion of the one or more panels when the one or more panels are attached to the second mounting clip to electrically and mechanically couple the one or more panels to the second mounting clip.

17. The second mounting clip of claim 15, wherein each of the wall flanges comprise a serrated edge along the z-direction for gouging at least a portion of the one or more panels when the one or more panels are attached to the second mounting clip to electrically and mechanically couple the one or more panels to the second mounting clip.

18. The second mounting clip of claim 15, wherein each of the wall flanges is pivotably connected to the base.

19. The second mounting clip of claim 15, wherein the top cap flange comprises at least one spring tabs extending downward from the top cap flange.

20. The second mounting clip of claim 15, further comprising at least two attachment flanges extending downwardly from the base, each of the attachment flanges configured to interface with a portion of the supporting structure to removably attach the base to the supporting structure.

21. The second mounting clip of claim 15, further comprising at least one central indexing tab extending upwardly from the base to form an angle with the base of about 90 degrees, the at least one central indexing tab providing a y-direction indexing guide for attaching the one or more panels.

22. The second mounting clip of claim 15, wherein the second mounting clip is made of a spring material.

23. The second mounting clip of claim 15, wherein the second mounting clip is made of an electrically conductive material and is configured to provide a grounding path from the one or more panels through the supporting structure.

24. The second mounting clip of claim 15, wherein the base comprises at least one aperture configured to receive at least a portion of a nesting flange of a first mounting clip to detachably couple the first mounting clip to the second mounting clip.

* * * * *